(12) United States Patent
Trainor

(10) Patent No.: US 11,615,097 B2
(45) Date of Patent: Mar. 28, 2023

(54) TRIGGERING A USER INTERACTION WITH A DEVICE BASED ON A DETECTED SIGNAL

(71) Applicant: Oracle International Corporation, Redfwood Shores, CA (US)

(72) Inventor: Jarlath Trainor, Belfast (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 310 days.

(21) Appl. No.: 16/806,531

(22) Filed: Mar. 2, 2020

(65) Prior Publication Data
US 2021/0271726 A1    Sep. 2, 2021

(51) Int. Cl.
| | |
|---|---|
| *G06F 16/2455* | (2019.01) |
| *G06F 3/16* | (2006.01) |
| *G06Q 10/08* | (2012.01) |
| *G06Q 30/06* | (2012.01) |
| *G06Q 10/0837* | (2023.01) |
| *G06Q 10/0833* | (2023.01) |
| *G06Q 30/0601* | (2023.01) |

(52) U.S. Cl.
CPC ........ *G06F 16/24568* (2019.01); *G06F 3/167* (2013.01); *G06Q 10/0833* (2013.01); *G06Q 10/0837* (2013.01); *G06Q 30/0601* (2013.01)

(58) Field of Classification Search
CPC .............. G06F 16/24568; G06F 3/167; G06Q 10/0833; G06Q 10/0837; G06Q 30/0601
See application file for complete search history.

(56) References Cited

U.S. PATENT DOCUMENTS

| | | | |
|---|---|---|---|
| 2015/0167995 A1* | 6/2015 | Fadell | F24F 11/62 |
| | | | 700/275 |
| 2018/0101195 A1* | 4/2018 | Meriaz | G06F 1/1654 |
| 2019/0251417 A1* | 8/2019 | Bennett | G06F 40/30 |
| 2020/0285568 A1* | 9/2020 | Alff | G06F 11/3676 |
| 2020/0395007 A1* | 12/2020 | Cheng | G06N 20/00 |
| 2021/0026913 A1* | 1/2021 | Grubb | H04L 67/22 |

OTHER PUBLICATIONS

Kim et al. "Efficient large-scale neural domain classification with personalized attention," Proceedings of the 56th Annual Meeting of the Association for Computational Linguistics (vol. 1: Long Papers), 2018. (Year: 2018).*

(Continued)

*Primary Examiner* — Jay A Morrison
(74) *Attorney, Agent, or Firm* — Potomac Law Group, PLLC

(57) ABSTRACT

Systems and methods are provided for detecting a signal to configure a user device. Data associated with a user interaction can be received, where the data include input that was received from the user at a first device. A signal can be recognized based on the received data about the user. A second device can be configured to interact with the user based on the recognized signal, the interacting including an audio interaction or a visual interaction. A software function that implements an action item can be executed, where the execution of the software function is based on second input from the user received at the second device.

20 Claims, 13 Drawing Sheets

(56) References Cited

OTHER PUBLICATIONS

Gebhart, "How to bring Alexa into every room of your home," CNet, Feb. 2, 2017, https://www.cnet.com/home/smart-home/how-to-install-alexa-in-every-room-of-your-home/ (Year: 2017).*
Nield, "How to Use Amazon Alexa and Google Assistant From a Computer," Gizmodo, May 23, 2017, https://gizmodo.com/how-to-use-amazon-alexa-and-google-assistant-from-a-com-1795289722 (Year: 2017).*
Dhamija, "Adding Alexa as a Conversation Channel to your Oracle Digital Assitant Chatbot", Nov. 2018.
Uliyar, "A Primer: Oracle Intelligent Bots", Powered by artificial intelligence, White Paper, Sep. 2017.

* cited by examiner

TRIGGERING A USER INTERACTION WITH A DEVICE BASED ON A DETECTED SIGNAL

FIELD

The embodiments of the present disclosure generally relate to triggering a user interaction with a device based on a detected signal.

BACKGROUND

The number of user devices has grown in recent years, and users are interacting with different user devices to accomplish various tasks. This diversity of user devices presents the opportunity to interact with a user in different mediums. For example, a smart speaker can interact with a user in a different way from a tablet. In addition, users can at times feel a certain comfort level interacting with a certain user device in a certain way, for instance based on habit. Techniques that successful leverage these different mediums of interaction can be advantageous.

SUMMARY

The embodiments of the present disclosure are generally directed to detecting a signal to configure a user device. Data associated with a user interaction can be received, where the data include input that was received from the user at a first device. A signal can be recognized based on the received data about the user. A second device can be configured to interact with the user based on the recognized signal, the interacting including an audio interaction or a visual interaction. A software function that implements an action item can be executed, where the execution of the software function is based on second input from the user received at the second device.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Embodiments trigger a user interaction with a device based on a detected signal. For example, a user can initiate an interaction with a digital assistant, for example through a text based chat channel or a conversational channel, or a user can interact with a webpage, web application, or any other suitable web presence (e.g., a web channel interaction). Based on this interaction, a signal can be detected by embodiments, such as through the use of machine learning, rules, or other techniques. For example, through a chat or conversation with the user, a chatbot can identify a signal in the user interaction, or a configured server can identify a signal in a user's web actions. In some embodiments, the signal can indicate a user's interest in purchasing a product or service.

In some embodiments, based on the user's interactions on a first client device and one or more detected signals, a second user device can be configured to interact with the user in a different channel. For example, a signal identified for a text based chat interaction on first user device (e.g., smartphone) can be used to trigger interaction with the user on a tablet (e.g., a display based interaction) or using a smart speaker (e.g., conversational interaction). In another example, a signal identified in a user's web actions using a first user device (e.g., tablet) can be used to trigger a text or dialogue based interaction (e.g., on a separate client device, such as a smartphone) or an interaction using a smart speaker (e.g., conversational voice interaction).

Embodiments can trigger user interaction on a separate client device in a different channel to improve user experience. For example, some users may prefer having certain interactions on certain devices (e.g., selecting from a list of service options on a tablet rather than a smartphone, navigating a menu based on a conversation with a smart speaker rather than a text based chat on a smartphone or tablet, and the like). Embodiments leverage the proliferation of client devices to interact with users in a preferred manner, and thus improve user experience.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
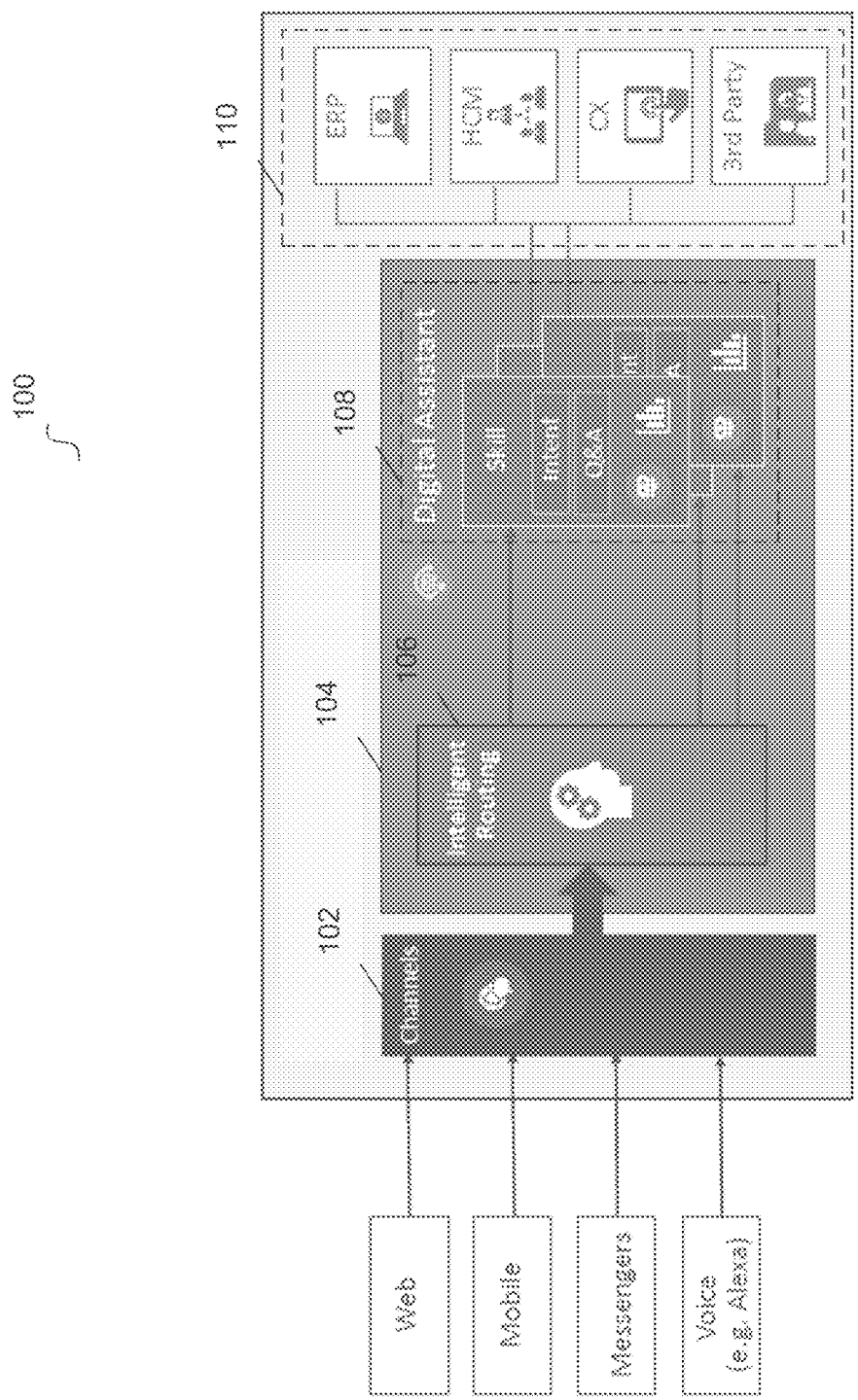
FIG. 1 illustrates a system for triggering a user interaction with a device based on a detected signal according to an example embodiment.

FIG. 1 illustrates a system for triggering a user interaction with a device based on a detected signal according to an example embodiment. System 100 includes channels 102, server 104, routing 106, digital assistant 108, and end components 110. In some embodiments, channels 102 can include a web channel (e.g., website or web application interaction using a client device, such as a laptop or desktop), a mobile channel (e.g., website, web application, or native application interaction using a client device, such as a smartphone or tablet), a messenger channel (e.g., messaging such as short message service ("SMS"), WhatsApp, FB Messenger, Slack, iMessage, and the like), or voice (e.g., smart speaker interaction, or another digital assistant interaction). Any other suitable channels can be implemented.

Server 104 can interact with the user (e.g., using one or more client devices) through channels 102. Server 104 can include routing 106, which can intelligently route traffic (e.g., that includes user interaction data in a given channel) to one or more instances of digital assistant 108. For example, digital assistant 108 can include a number of skills. In some embodiments, skills can be considered chatbots (or a similar configurable chat enabled software element) that are configured to accomplish specific tasks. For example, digital assistant 108 and a configured skill can be used to detect one or more user intents based on interactions with the user. In some embodiments, routing 106 intelligently routes traffic to one or more configured skills of digital assistant 108.

In some embodiments, digital assistant 108 can achieve interaction between a user and one or more end components 110. For example, end components 110 can include enterprise resource planning software, human capital management software, customer service software, or any other suitable third-party software. Digital assistant 108 can include skills configured to interact with a number of end components 110.

In some embodiments, digital assistant 108 can be software that uses artificial intelligence and machine learning to combine independent chatbots into a single conversational interface that assists real users throughout their day. Oracle® Digital Assistant manages and coordinates multiple smaller-scoped skill bots to a composite chatbot solution that assists users in completing multitask conversations. Oracle® Digital Assistant intelligently routes user requests to the skill bot that matches the user query. Oracle® Digital Assistants create a natural, context aware conversational interface, through text or speech that can detect what the user is trying to achieve (intent) and respond appropriately with information or results of transactions from Application Programming Interface ("API") connections to any back-end enterprise applications and information sources.

In some embodiments, digital assistant 108 (or another software component, such as a component not depicted in FIG. 1) can detect a signal in a user interaction via a given channel of channels 102. For example, a skill of digital assistant 108 can be configured to detect a signal in the user interaction based on a chat with the user on a first client device via one of channels 102.

Based on the detected signal, server 104 (or another software component, such as a component not depicted in FIG. 1) can initiate an interaction with the user on a second client device, such as a tablet or a smart speaker. The interaction with the second client device can be over a different channel from channels 102 and/or can leverage another skill of digital assistant 108. In some embodiments, the interaction with the user on the second client device over the different channel may result in improved user experience, such as provide an improved interface for accomplishing a task associated with the signal detected in the initial user interaction.

The following description includes recitations of a criterion or criteria. These terms are used interchangeably throughout the disclosure, the scope of criteria is intended to include the scope of criterion, and the scope of criterion is intended to include criteria.

Figure 2:
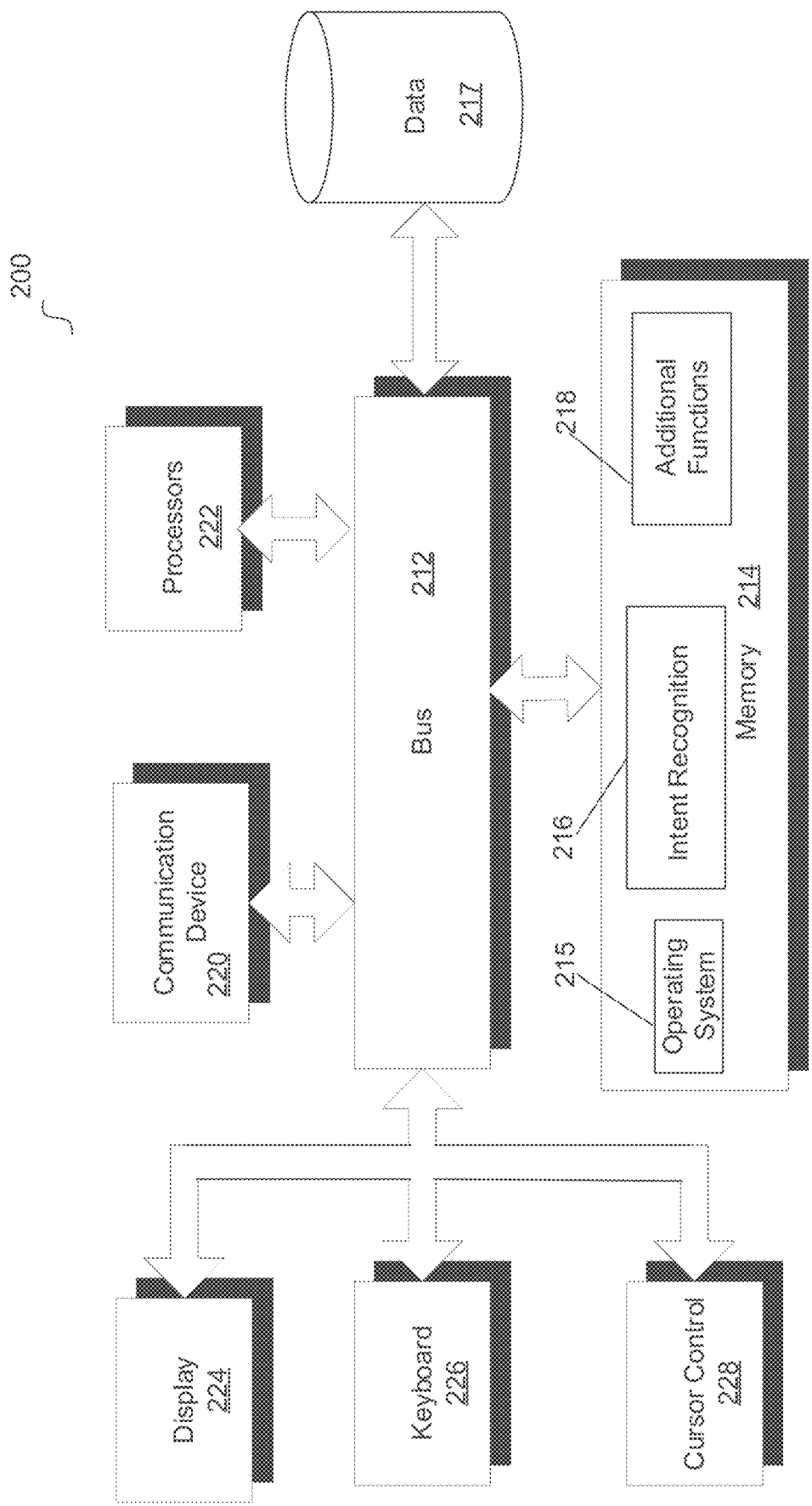
FIG. 2 illustrates a block diagram of a computing device operatively coupled to a system according to an example embodiment.

FIG. 2 is a block diagram of a computer server/system 200 in accordance with embodiments. All or portions of system 200 may be used to implement any of the elements shown in FIG. 1. As shown in FIG. 2, system 200 may include a bus device 212 and/or other communication mechanism(s) configured to communicate information between the various components of system 200, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 200. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, intent recognition module 216, and other applications 218, stored within memory 214.

System 200 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 200. The modules can include an operating system 215, a intent recognition module 216 that implements the user interaction functionality disclosed herein, as well as other applications modules 218. Operating system 215 provides operating system functionality for system 200. In some instances, intent recognition module 216 may be implemented as an in-memory configuration. In some implementations, when system 200 executes the functionality of intent recognition module 216, it implements a non-conventional specialized computer system that performs the functionality disclosed herein.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium. Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 200.

In some embodiments, system 200 can be part of a larger system. Therefore, system 200 can include one or more additional functional modules 218 to include the additional functionality. Other applications modules 218, intent recognition module 216, or any other element of system 200 may include various modules of Oracle® Cloud Platform, Oracle® Cloud Infrastructure, Oracle® Digital Assistant, Oracle® Cloud Applications, for example. A database 217 is coupled to bus 212 to provide centralized storage for modules 216 and 218 and to store, for example, data received by intent recognition module 216 or other data sources. Database 217 can store data in an integrated collection of logically related records or files. Database 217 can be an operational database, an analytical database, a data warehouse, a distributed database, an end-user database, an external database, a navigational database, an in-memory database, a document-oriented database, a real-time database, a relational database, an object-oriented database, a non-relational database, a NoSQL database, Hadoop® distributed file system ("HFDS"), or any other database known in the art.

Although shown as a single system, the functionality of system 200 may be implemented as a distributed system. For example, memory 214 and processor 222 may be distributed across multiple different computers that collectively represent system 200. In one embodiment, system 200 may be part of a device (e.g., smartphone, tablet, computer, and the like). In an embodiment, system 200 may be separate from the device, and may remotely provide the disclosed functionality for the device. Further, one or more components of system 200 may not be included. For example, for functionality as a user or consumer device, system 200 may be a smartphone or other wireless device that includes a processor, memory, and a display, does not include one or more of the other components shown in FIG. 2, and includes additional components not shown in FIG. 2, such as an antenna, transceiver, or any other suitable wireless device component.

Figure 3:
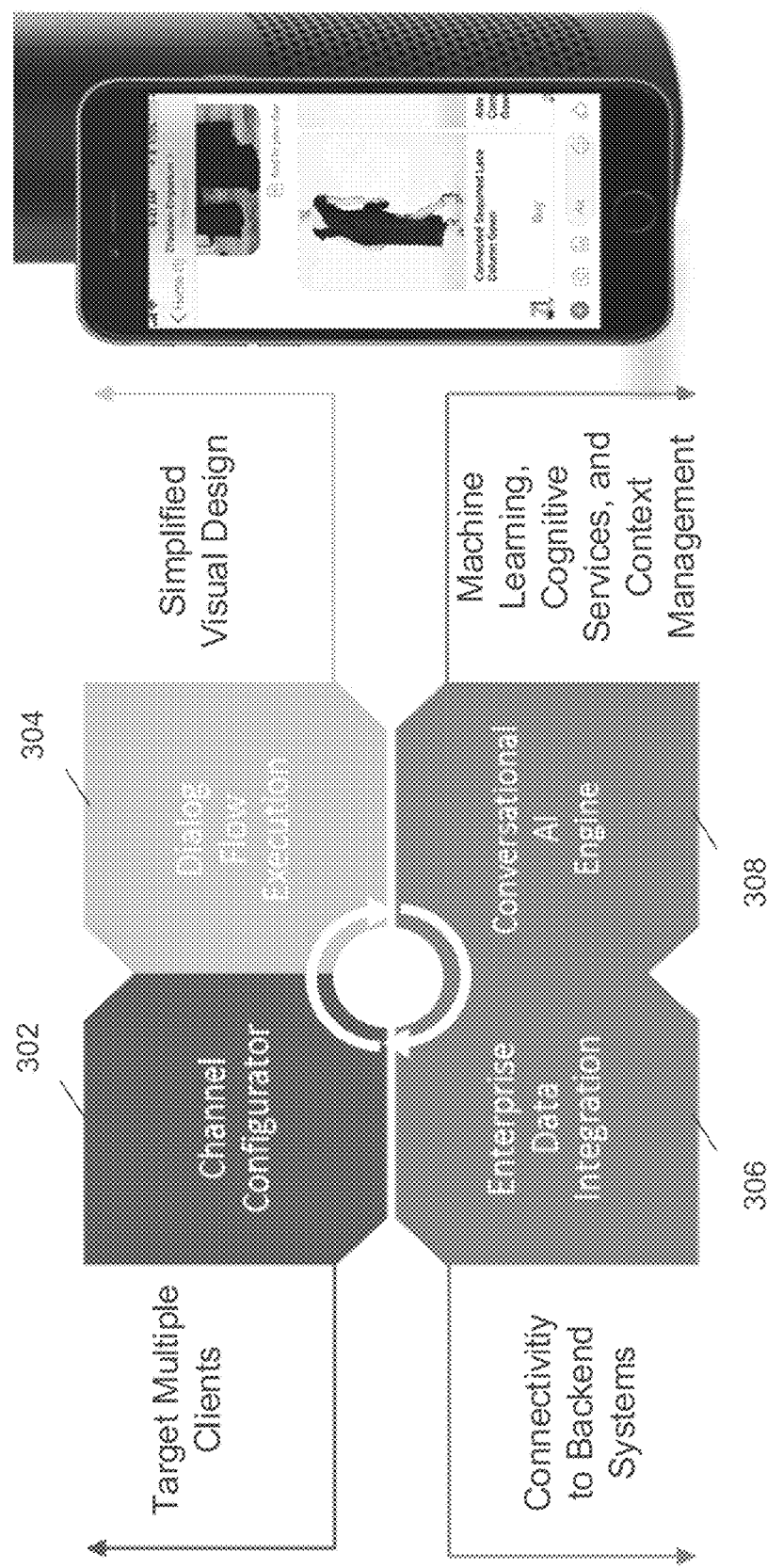
FIG. 3 illustrates a diagram for using multiple channels to interact with a user according to an example embodiment.

FIG. 3 illustrates a diagram for using multiple channels to interact with a user according to an example embodiment. FIG. 3 includes channel configurator 302, dialog flow execution 304, enterprise data integration 306, and conversational engine 308. The diagram of FIG. 3 illustrates the functionality of a digital assistant in some embodiments. For example, a digital assistant can include channel configurator 302 for communicating with users over a number of channels (e.g., messaging, voice, chat, and the like) and via a number of applications (e.g., Skype, third party digital assistants, such as Alexa, Siri, or Cortana, short message service ("SMS"), WhatsApp, FB Messenger, Slack, iMessage, Microsoft Teams, any other suitable messaging platform that supports Hyper Text Transfer Protocol ("HTTP") Webhooks, and the like).

In some embodiments, channel configurator 302 can abstract communication and user interface ("UI")/user experience ("UX") aspects of the channel. For example, messenger specific interfaces can be abstracted by channel configurator 302 such that a number of messaging applications can be compatible. In some embodiments, channel configurator 302 abstracts speech components, such as speech components related to voice assistants (e.g., Siri or Alexa) and/or can use a speech to text component to pass data to natural language processing elements.

A digital assistant can also include dialogue flow execution 304 for modeling a conversation. For example, dialogue flow execution 304 can include a state machine that executes a context driven workflow with scoped variables. In some embodiments, dialogue flow execution 304 can include components of artificial intelligence ("AI"), natural language processing ("NLP"), and machine learning such that a conversation/dialogue flow can be modeled.

A digital assistant can also include enterprise data integration 306 for connectivity with backend systems such as enterprise resource planning systems, human capital management systems, customer service systems, sales systems, e-commerce platforms, third-party systems, and the like. For example, enterprise data integration 306 can implement message channel visualization and include components that provide integration to mobile cloud services (e.g., use APIs that have been created for the mobile channel).

A digital assistant can also include conversational engine 308 for conversational artificial intelligence, such as machine learning, cognitive services, context management, chat bot functionality and other suitable functionality. For example, conversational engine 308 can include active machine learning that identifies the intent of the conversations (e.g., from the end user) and extracts entities from unstructured data (e.g., to create a structured 'query' to retrieve data from an enterprise and respond). In some embodiments, the conversational engine 308 includes an ensemble of algorithms.

As the proliferation of user devices continues, consumers will increasingly have a mix of websites, applications, devices (e.g., smartphones, tablets, smart speakers, and the like) and channels of interaction (e.g., web, mobile application, conversational chatbot, voice and the like) on their journeys, such as on purchasing journeys. Embodiments enable these interactions to be held simultaneously across channels. For example, to orchestrate/optimize the journey (e.g., in real-time) enterprises/merchants can leverage techniques to identify a signal (e.g., across channels simultaneously), such as a signal that indicates a consumer intent, and then can react to that signal accordingly (with decisioning technologies) to perform actions or surface/relay content via visual and/or audio client device.

In some embodiments, user signal (e.g., consumer intent which indicates value in a second channel of interaction, such as consumer need for assistance) can be identified, for example by utilizing pattern recognition in a user data stream. Identified signals can be then used to trigger a second channel of interaction, such as between a digital assistant and the user. For example, a user interacting with an enterprise webpage on a first client device using a first channel (e.g., smart phone using a display and user interface) can be prompted to communicate with a second client device using a second channel (e.g., smart speaker using a voice channel) based on a detected signal that the user has questions or is experiencing problems while interacting over the first channel.

In some embodiments, customer journey mapping and/or modeling across different channels (e.g., web, voice, and the like) can be implemented using, for example, Oracle® Streaming Analytics ("OSA"), decision models with Oracle® Adaptive Intelligence for CX, and/or event-driven rules engines such as the Oracle® Engagement Engine for customized guardrails. In some embodiments, Oracle® Adaptive Intelligence for CX implements layered decision science that selects algorithms/model (e.g., machine learning algorithms and/or models), features of the data, and/or hyperparameters suitable to various circumstances.

In some embodiments, Oracle® Engagement Engine can include one or more rules, or a combination of zero or more conditions and an action (e.g., IF CONDITION IS TRUE THEN PERFORM ACTION). Examples of conditions include:

Does the visitor have cookies enabled on their browser?

Is the visitor's IP address within a specified range of IP addresses?

Is today's date after a specified date?

Has the visitor previously been on a call with a contact center agent?

In some embodiments, an action is an instruction to be followed based on the condition(s). Example actions include:

Display a Call Invitation.

Run a custom JavaScript function.

Populate a custom data field with information from a specified HTML page element.

In some embodiments, a rule can be defined to determine when to display a call or chat invitation to a visitor. For example, a rule can be defined to display a call invitation when a visitor has been on a particular webpage for 60 seconds (e.g., dwell time meets or exceeds 60 seconds). In this case, the condition is that the visitor has been on a webpage for 60 seconds, and the action is to display a call invitation. This can be expressed as: IF TIMEONPAGE>=60 SECONDS THEN DISPLAY CALL INVITATION. In some embodiments, the inclusion of multiple conditions, actions, and false actions can result in a high level of scope for complexity when designing rules.

Embodiments of Oracle® Commerce Cloud functionality can also be extended through widgets, REST APIs, webhooks, and/or server-side extensions. For example, user interface customization, extensions, widgets and REST APIs can, at times, be employed together. In some embodiments, webhooks can be used as an outbound communication to integrate with external systems and REST APIs can be used for inbound communications from external systems. Embodiments also include server-side extensions, which allow customers and partners to develop custom code that runs on the server side. These extensions can be accessed either as a REST endpoint or configured as the receiving end of Webhooks.

In some embodiments, one or more of AI, machine learning, pattern recognition, and/or defined rules can be used to detect a signal in a user stream of data and trigger an interaction with a client device. For instance, a website for a fashion retailer can utilize pattern recognition or rules based technologies that determine/predict when a visitor has an intent to leave the website or is displaying intent to purchase but is in need of assistance. Embodiments can trigger an invitation to text or speak with a digital assistant (e.g., on a device other than the device used to navigate the website). In some embodiments, subsequent interactions with the digital assistant (e.g., online or voice) can be reflected on both the online/web channel and in the digital assistant channel (e.g. the online channel can be made aware of a simultaneous verbal help request to a proximate smart speaker). The online or web channel an also be configured to display other useful information, such as a Frequently Asked Questions ("FAQ") webpage, a link to a product detail webpage ("PDP"), and/or a review webpage, to assist in the user interaction. Embodiments can also mirror/connect updates of interfaces (e.g., graphical user interfaces ("GUIs") across online devices (e.g., smartphone, tablet, laptop, desktop, a smart speaker with a screen, a wearable device with a screen, and the like) synchronously—for visual communication to the consumer—and quicker and easier ingest of information (e.g., visual and verbal).

In some embodiments, common entities, like a shopping cart and user profile, can be maintained and synchronized across channels, such as online and voice channels, with Oracle® Coherence (a distributed cache and in-memory data grid solution that is used by applications for fast and reliable access to frequently used data). The Oracle® Integration Cloud Service ("ICS") can also be used for applications to communicate with declared mappings and workflows. In some embodiments, reconciling a consumer's interactions across client devices communicating over multiple channels (e.g., online/web device and a conversational device) can be achieved by identification services like the Oracle Cloud Commerce Service ("OCCS") Unified VisitorID Service ("UVS"), which allows multiple web applications, sites or components to share a unique visitor identity value.

Conventional implementations fail to achieve real-time pattern recognition and decisioning technologies across channels and devices (e.g., online and conversational channels). Conventional implementations also fail to present and detect common cross-channel information and actions to shared devices. Embodiments utilize stream processing, event pattern recognition, and decision engine technologies to implement real-time and cross-channel cloud based commerce services. Data and mobile application technologies (e.g., running on cloud container services) for enterprise back-end integration can also be implemented. Embodiments also enable cross-channel interactions with privacy preserving techniques, as users do not necessarily need to install a mobile application from the merchant. User privacy can also be maintained when triggered interactions are based on consent from the user (e.g., consent achieved based on a web message/notification). In some embodiments, user data can be stored in an encrypted format, and can be stored for selective purposes (e.g., minimum data necessary to achieve a specific objective).

Figure 4:
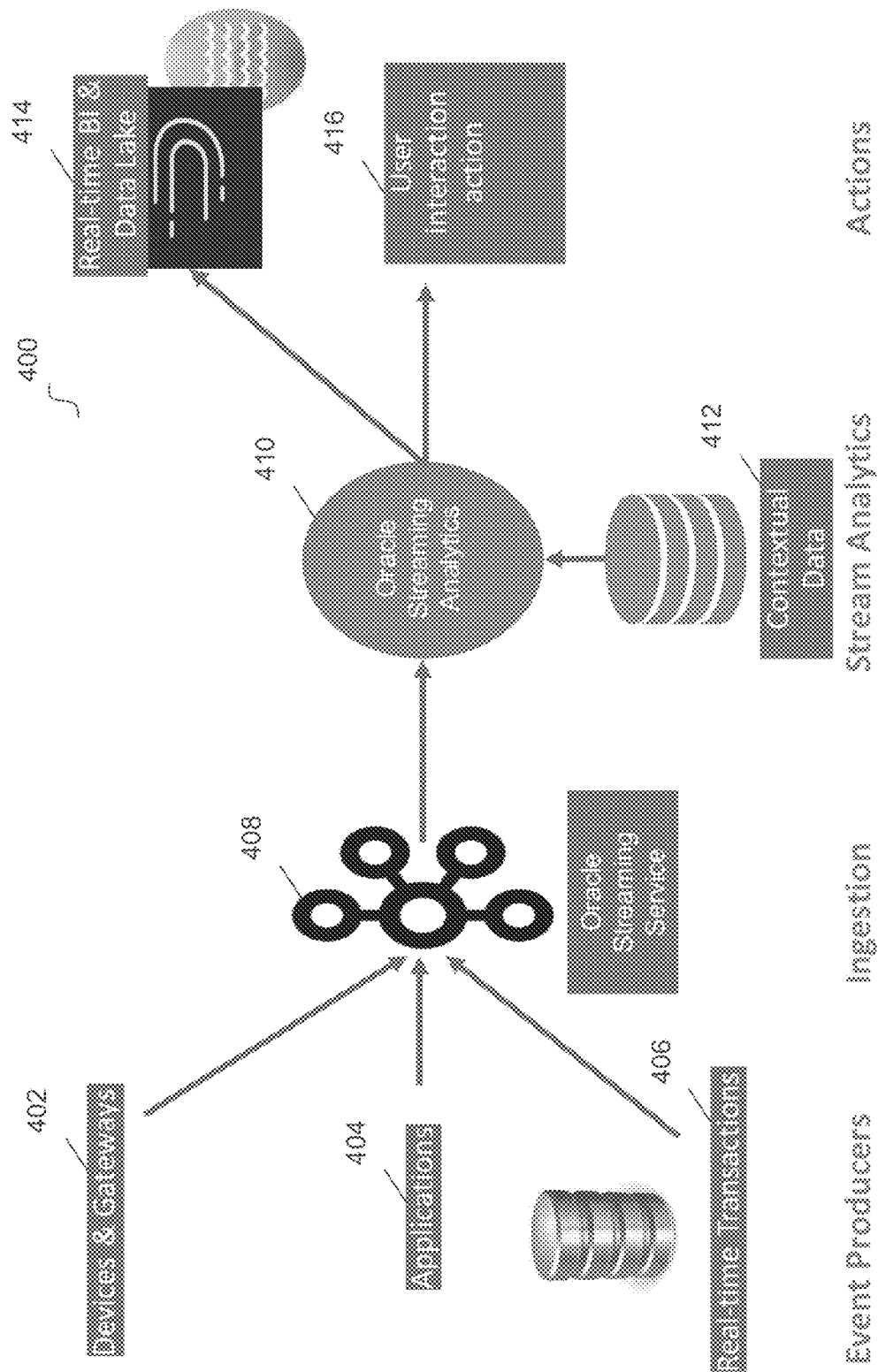
FIG. 4 illustrates a system for processing an event stream using pattern recognition according to an example embodiment.

FIG. 4 illustrates a system for processing an event stream using pattern recognition according to an example embodiment. In some embodiments, system 400 can represent a Kafka ecosystem that includes event producer elements, ingestion elements, stream processing elements, and elements that can take action based on the functionality of the previous Kafka elements (e.g., triggering a user interaction on a separate client device). For example, server 104 of FIG. 1 can include elements of system 400. Embodiments of the Kafka ecosystem can include a low latency, high throughput, scalable, and decoupled message broker.

Devices and gateways 402 can include electronic devices, network components, such as gateways, and any other suitable device. For example, devices 402 can include client devices such as smartphones, smart speakers, tablets, laptops, other devices capable of interactions with users, and any other suitable device or gateway. Applications 404 can include software applications capable of interacting with users, receiving/producing events for publication to a stream of events, and can further include micro-services. For example, applications 404 can include web browsers, software on client devices such as a smart speaker capable of interacting with a user and/or cloud service, software on a tablet such as a native application, software on a laptop or desktop, conversational software, chat software, and the like.

Real-time transactions 406 can include software elements, such as a database, and that can publish real-time transactions as a stream. Each of these elements can serve as an input for Kafka producers. For example, one or more of database transaction logs, sensor data, social media data, a click stream or web activity (e.g., for a user of an electronic device), audio data (e.g., utterances from a user), chat data (e.g., between a user and a bot), and/or geo-location data can be used to produce a stream of events.

Streaming service 408 can be used to ingest data from the producers to build the stream of events. In some embodiments, streaming service 408 receives the input from one or more of devices and gateways 402, applications 404, and real-time transactions 406 and builds the Kafka topics and partitions that are used to structure event streams in a Kafka ecosystem. For example, one or more of devices and gateways 402, applications 404, and real-time transactions 406 can be Oracle® Cloud Commerce client producing elements and streaming service 408 can be Oracle® Streaming Service ("OSS").

In some embodiments, clients producing events of interest (such as page views, searches, and the like), can generate data conforming to a standard or protocol (e.g., an (Apache) Avro schema). For example, Avro schemas can be defined using JavaScript Object Notation ("JSON"), and Jackson (a Java library for handling tasks like reading and writing (parsing/generating) and data binding to/from Java objects) can convert the JSON objects into generated Avro schema classes. These generated Avro schemas can then be serialized into a byte array and sent as the payload of a Kafka message. Any other suitable data formats and functional elements (e.g., Jackson substitutes) can be implemented.

In some embodiments, the data can be placed onto a Kafka topic (e.g., shared between Kafka elements, such as OCCS and OSS). For example, data can flow from OCCS into OSS via Kafka topics, which are defined and configured in OSS. OCC REST endpoints can call into code which serializes data into messages to be placed onto that topic. In some embodiments, the data can be deserialized (the reverse process) at the point of consumption.

In some embodiments, a visitor ID can be associated with a particular user/visitor/electronic device (e.g., via an identification service). For example, a user can be assigned a visitor ID value by OCCS Visitor ID Service. In some embodiments, a visit or session can be defined as a series of page requests or, in the case of tags, image requests (e.g., from the same uniquely identified client). A visit can be considered ended when no requests have been recorded in some number of elapsed time (e.g., a 30-minute time out, and the like). In different circumstances a visit can include one page view or thousands. A visitor can be considered the uniquely identified client that is generating page views or hits within a defined time period (e.g., day, week or month). In some embodiments, a uniquely identified client can be a combination of a machine (e.g., desktop computer at work, smartphone, laptop, tablet, and the like) and a web browser. In an example, the identification (which can include the Visitor ID) can be a persistent cookie that has been placed on the device by the site page code, an additional piece of cached JavaScript, or any other suitable form of identification.

In some embodiments, a visitor profile can allow multiple web applications, sites, or components to manage visitor(s) across applications, sites, or components, including sharing of key data. For example, this can be sharing of visitor information, as specified by a customer across shared services (e.g., Oracle® Engagement Engine, Commerce, Recommendations, Oracle Service Cloud, and the like).

In some embodiments, the visitor ID can be passed to streaming service 408 or other Kafka ecosystem components (e.g., via Kafka messaging). For example, the visitor ID can be used to access a data store (e.g., data lake) to retrieve data (e.g., contextual data) about the user/visitor/electronic device. In some embodiments, a visitor ID can be associated with multiple user devices (e.g., tablet, smart speaker, smartphone, laptop, and the like).

In some embodiments, one or more event producers can include Oracle® GoldenGate Big Data Handler for Kafka, where updates to database records (such as orders and user profiles) can be replicated to a Kafka component, such as streaming service 408, in real-time. In the context of Kafka, Oracle® GoldenGate provides a mechanism for streaming changes made to a table (or set of tables) and making them available to other components/processes in a pipeline. In some embodiments, streaming service 408 can be an Oracle® Streaming Service, Oracle® Engagement Engine, and/or Oracle® Stream Analytics service or any other suitable component of a Kafka ecosystem.

Stream analytics 410 can be used to analyze the built stream of events to perform additional processing. For example, stream analytics 410 can filter, aggregate, transform, correlate, and/or geofence the data from producers to build (consume and pipeline) the stream of events. Stream analytics 410 can be a Kafka stream processing element. In some embodiments, stream analytics 410 can be implemented using Oracle® Streaming Service, Oracle® Engagement Engine, and/or Oracle® Stream Analytics. Embodiments include performing pattern recognition within built streams of events using stream analytics 410. For example, a number of predetermined patterns can be defined, and stream analytics 410 can analyze built streams of events to recognize the predetermined patterns within the streams.

Example predetermined patterns that can be used to determine intent can include predefined associations or event relationships. For example, predetermined patterns can include event associations such as: 'A' followed by 'B', 'A' not followed by 'B', Detect Missing Event, Detect Duplicates, and other suitable patterns. A predetermined pattern with an 'A' followed by 'B' association can include event definitions for the 'A' and 'B' events, such as an 'A' event that adds a product to a cart and a 'B' event that removes the product from the cart. Other 'A' followed by 'B' examples can include: searching for a product or category and then viewing a product specific webpage; searching for a product and then searching for a specific variant of that product; canceling an order after being notified of a shipment delay; adding a product to a cart and triggering stock check that determines the item is in-stock at a nearby store; and the like.

A predetermined pattern with an 'A' not followed by 'B' association can also include event definitions for the 'A' and 'B' events, such as an 'A' event that adds a product to a cart and a 'B' event that does not include checkout of the cart (e.g., finalizing the order). Other 'A' not followed by 'B' examples can include: searching for a particular product or category and then not viewing any specific product detail page; navigating to a lowest level product category but not viewing any specific product detail page; searching for a product previously purchased by the user but not adding the product to a cart; having items in a cart but failing to checkout; checking out an order but failing to qualify for free shipping based on the total amount for the order; checking out an order but failing to qualify for a promotion; and the like.

A predetermined missing event pattern can define a series of a events, where it can be recognized when one of the defined events is missing, such as searching for a product or category, adding a product to a cart, but failing to checkout (e.g., finalize the order). Other missing event patterns can include: adding products to a cart, checking out, but encountering a payment authorization failure (or some other failure)

that causes the order to not be submitted/processed; repeated viewing of a product specific page without the product being added to a cart; and the like.

A change detector pattern, up-trend pattern, and/or down-trend pattern can define event associations related to the changes in the value of a data point, where a change can be detected, an up-trend can be detected, or a down-trend can be detected. Example events can include an increase or decrease in the number of searches performed, an increase or decrease in the number of visits for a user (e.g., visits to a given website over a period of time), an increase or decrease in an amount spent at a website by a user (e.g., dollar amount spent over a period of time), and the like. Other example data points for which changes or trends can be detected are transactions types (e.g., changes to a number of order online pick up in store transactions or direct ship to customer transactions), a number of returns, and the like.

A predetermined timing pattern can define an amount of time, where it can be recognized when the amount of time has elapsed (e.g., based on Oracle® Engagement Engine rules). For example, a time on page pattern/rule (e.g., dwell time) can compare the time that a visitor has been on the current page of the website against a specified value. The time on page pattern/rule can include the following conditions: operator (used to specify the type of comparison to perform); and time (used to set the upper limit of the time the visitor spends on a page before a criteria is met and/or before returning a true value). In another example, a time on site pattern/rule (e.g., dwell time) can compare the time that a visitor has been on the website against a specified value. The time on site pattern/rule can include the following conditions: operator (used to specify the type of comparison to perform); and time (used to set the upper limit of the time the visitor spends on a website before a criteria is met and/or before returning a true value). Time can be defined in hours, minutes, and seconds (e.g., using numeric steppers).

In some embodiments, these patterns can be combined (e.g., in a pipeline) such that a defined pattern can include any combination of the above described patterns, including, but not limited to: an 'A' followed by 'B' pattern with a location based pattern, multiple 'A' followed by 'B' patterns (or multiple iterations of any of the patterns), a missing event pattern with a location based pattern, event patterns and timing patterns, and the like.

In some embodiments, a number of events can occur between, for example, an 'A' followed by 'B' pattern of events, and the predetermined pattern can still be recognized within the event stream. For example, for a pattern that includes an 'A' and 'B' event of adding and removing a product from a cart, the intervening events can include viewing different product pages, adding and/or removing other products from the cart, performing searches, and the like. In this example, the 'A' followed by 'B' pattern is recognized within the event stream among the intervening events. Other patterns can similarly be recognized in the presence of intervening events. In some embodiments, a recognized pattern can be used to provide relevant information to internal systems/entities. For example, real-time information can be provided to various teams (e.g., customer experience, customer engagement, marketing, and others) on products viewed or searched in the last visit (or X visits) but not purchased by a user/visitor.

In some embodiments, contextual data about the electronic device or a user of the electronic device can be used to determine an intent/recognize a signal in the streaming data. For example, this contextual data can include past online shopping behavior (e.g., past product purchases, a frequency for purchasing, a frequency for taking advantage of promotions, and the like), past products viewed (e.g., over a 30 day window), past searches, geolocation history, device type(s) (e.g., mobile device, laptop, desktop, smart speaker), day of week/month and/or time of day behavior (e.g., day of week/month and/or time of day when a user typically views or browses versus when a user typically submits online purchases), weather history (e.g., current or forecasted/predicted weather), user demographic information, and the like.

In some embodiments, a contextual criteria can be used in addition to a recognized predetermined pattern. For example, when a pattern is recognized in a stream of events, contextual data for the corresponding user can be compared to a contextual criteria. The contextual criteria can be based on the recognized pattern. For example, when a pattern indicates repeated views of a product, the contextual criteria may relate to the frequency that the corresponding user buys the product or a similar product. When the frequency meets the contextual criteria (e.g., when the user regularly buys the product or a similar product), a corresponding action can be taken (e.g., another interaction with the user or a separate device and channel can be triggered). In an example where the pattern represents a cart that has had a product removed, the contextual criteria can include the user's past transaction history with the product. For example, if the user has not previously purchased the product, a corresponding action can be taken (e.g., triggering a user interaction through a new client device, such as using a push message/notification).

Based on the processing and analytics performed by stream analytics 410, one or more actions can be performed. For example, module 414 can perform real-time business intelligence functionality or can store relevant/insightful data in a data lake. Further, module 416 can perform an interaction with an electronic device/user, such as transmit a web push message to the electronic device based on a recognized pattern within a stream of events associated with the electronic device and/or contextual data associated with a user of the electronic device meeting a contextual criteria. In some embodiments, the web push message can prompt the user to interact with a new client device (e.g., smart speaker), where user consent is received (based on the web push notification) to interact with the new client device.

Embodiments can achieve the disclosed functionality using a number of technologies, frameworks, standards, and implementations. For example, Apache Kafka Streams API can be leveraged for stream processing. Apache Flink can also be used for streaming and batch processing in a high throughput, low latency mode. KSQL from Confluent, a streaming SQL engine that enables real-time data processing against Apache Kafka, can be used to analyze/process a Kafka stream. Apache Spark Streaming (from Databricks) is a scalable fault-tolerant streaming processing system that natively supports both batch and streaming workloads.

Oracle® BigData SQL ("BDSQL") can query across Kafka topics (e.g., in flight data) and persisted data (e.g., in Oracle® relational databases, NoSQL data stores, Hadoop data lakes, and the like). In addition, the SQL Pattern matching functionality in the Oracle® 12c database can also be used to augment or in place of Oracle® Streaming Analytics pattern matching. Embodiments can also recognize patterns in sequences of events using SQL, for example by treating a sequence as a stream of rows, and using a row in a stream to represent an event. Embodiments of Oracle 12c database incorporate a MATCH_RECOGNIZE clause into the analytic function syntax to enhance pattern matching from SQL. Oracle® Sparkline can also be used with/in place of data lake business intelligence (e.g., at scale).

In some embodiments, recognized pattern(s) and/or contextual data can be used to trigger user interaction on a new client device over a new channel. For example, a signal that indicates a user experiencing a technical issue can be detected in a user stream (e.g., stream of web data). In some embodiments, the user stream can be generated by a user navigating a website of a commerce entity on a smartphone. Based on the detected signal, the user can be prompted to interact with a proximate smart speaker. For example, a web push message/notification can be transmitted to the user's smartphone, and after receiving consent from the user based on the web push message/notification, the user interaction on the smart speaker can be triggered.

Web push messages/notifications can be selectable (clickable) messages, sent to the user's/visitor's/subscriber's browsers (e.g., running on a client device, such as a smartphone) and can appear next to the task bar (or in the display of a mobile device). These messages/notifications can be "browser based", which means they can be accessible across different platforms and devices. In addition, whether users are connected through mobile devices, tablets, or desktops, web push messages/notifications can reach their devices in real-time. In addition, a web push notification can be displayed when the web browser is browsing any website. In some embodiments, the web push notifications can include selectable actions, such as hyperlinks, and rich media. Web push messages/notifications can be particularly effective, for example because they can be brief and can be delivered in real-time to increase user engagement and customer retention. In some embodiments, web push messages/notifications can be used to trigger a user interaction on a separate client device based on receiving consent from the user.

Embodiments can be implemented for a merchant's e-commerce web presence, such as a website. Consider a visitor to a merchant's website (e.g., using the OCCS, with the OCCS client configured as a progressive web application). The visitor's consent and opt-in to receive push notifications from the site can be retrieved based on a message to the visitor's electronic device. For example, the opt-in can be secured initially based on messaging, and subsequently web push messages can be sent to the user/electronic device based on this initial opt-in. In some embodiments, the opt-in must be secured before the visitor's electronic device can receive push messages. Thereafter, based on predetermined detection patterns of the visitor's behavioral events (e.g., detected signal of intent in the user's data stream) and, optionally, based on the visitor's context (e.g., past behavior, geolocation, device, audience, time of day, weather, demographics etc.), one or more push messages can be transmitted to the visitor's electronic device, which can be configured to display such a notification (e.g., in a mobile web browser in real-time). Such functionality can avert missed opportunities for the interaction with the user, reduce friction with the shopping experience, and provide other tangible benefits that flow from better understanding a visitor's intent by way of behavioral analytics.

For example, a lost opportunity can be a contextual stream pattern with a visitor searching on site for a product or category, adding a product to a cart, and then removing the product from the cart. This can be similar to a flow in a brick and mortar store where a customer physically picks up a product, examines it, but places it back down (and in some instances, this interaction can be captured by sensing equipment, such as cameras). In this example, an intervention action (with a push notification) can be performed without the need for a native mobile application, for instance when a progressive web application is implemented by the merchant/cloud service provider. Embodiments include progressive web applications that provide utilities which are similar to conventional applications that are natively installed, including offline web pages, web push notifications, and improved load times. However, progressive web applications do not need to be downloaded/installed on the device itself, thus providing an enhanced online experience that is more likely to be adopted by the user/visitor. In some embodiments, a native mobile application can generate the user web stream.

Figure 5:
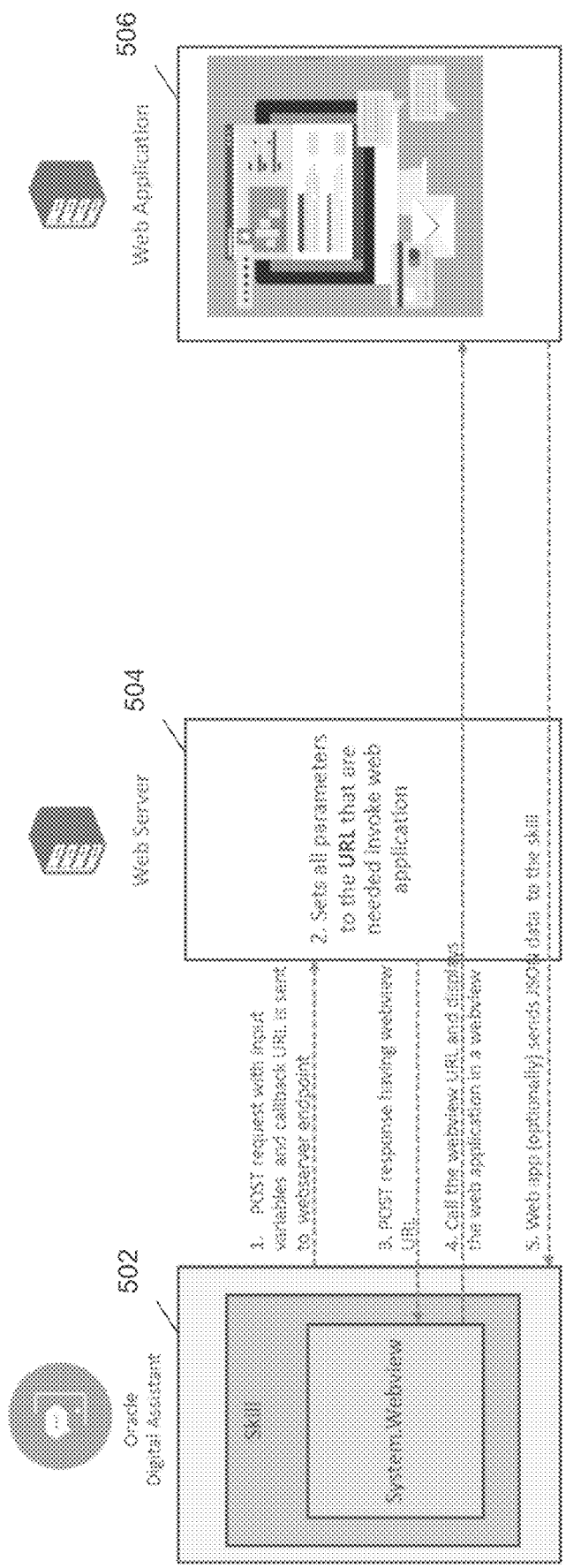
FIG. 5 illustrates communication between a digital assistant and connected devices according to an example embodiment.

Embodiments leverage user interaction through chat or voice, such as with a smart speaker or other device configured with a speaker and microphone (e.g., laptop), where a digital assistant can be used to provide the chat or voice services. FIG. 5 illustrates communication between a digital assistant and connected devices according to an example embodiment. For example, digital assistant 502 can interact with server 504 and web application 506. In some embodiments, the functionality illustrated in FIG. 5 can be triggered based on a detected signal in a client data stream (e.g., detected/recognized based on the functionality illustrated in FIG. 3). Digital assistant 502 can send a request, such as a POST request, with variables and callback to web server 504. For example, the request can include input variables and a callback URL. Web server 504 can set the parameters for invoking a web application (e.g., web application 506). The request response from web server 504 to digital assistant 502 can include the set parameters (e.g., a webview URL with the set parameters). Digital assistant 502 can then call web application 506 (e.g., using the webview URL) and display the web application in a webview. Web application 506 can then interact with digital assistant 502, such as by sending data (e.g., JSON data) to the digital assistant.

Figure 6:
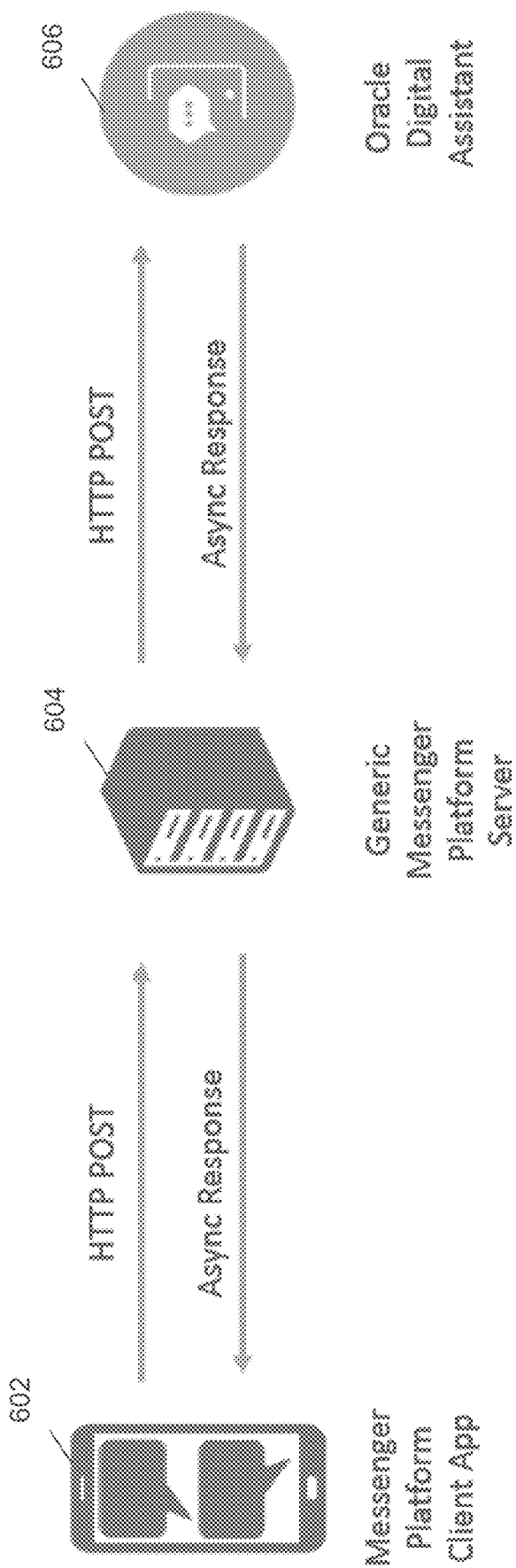
FIG. 6 illustrate device communication for a client application and a digital assistant according to an example embodiment.

FIG. 6 illustrate device communication for a client application and a digital assistant according to an example embodiment. Embodiments can be implemented with a number of client side application, such as messaging applications on a user's client device (e.g., smartphone). For example, user device 602 (e.g., a smartphone) with a messenger application can communicate with messenger platform 604, and the messenger platform can then communicate with digital assistant 606. For example, an HTTP request (e.g. POST request) can be sent from user device 602 to messenger platform 604, and messenger platform 604 can similarly send, based on the received request, an HTTP request to digital assistant 606. A response, Async response, can then be sent from digital assistant 606 to messenger platform 604, and messenger platform 604 to user device 602.

Figure 7:
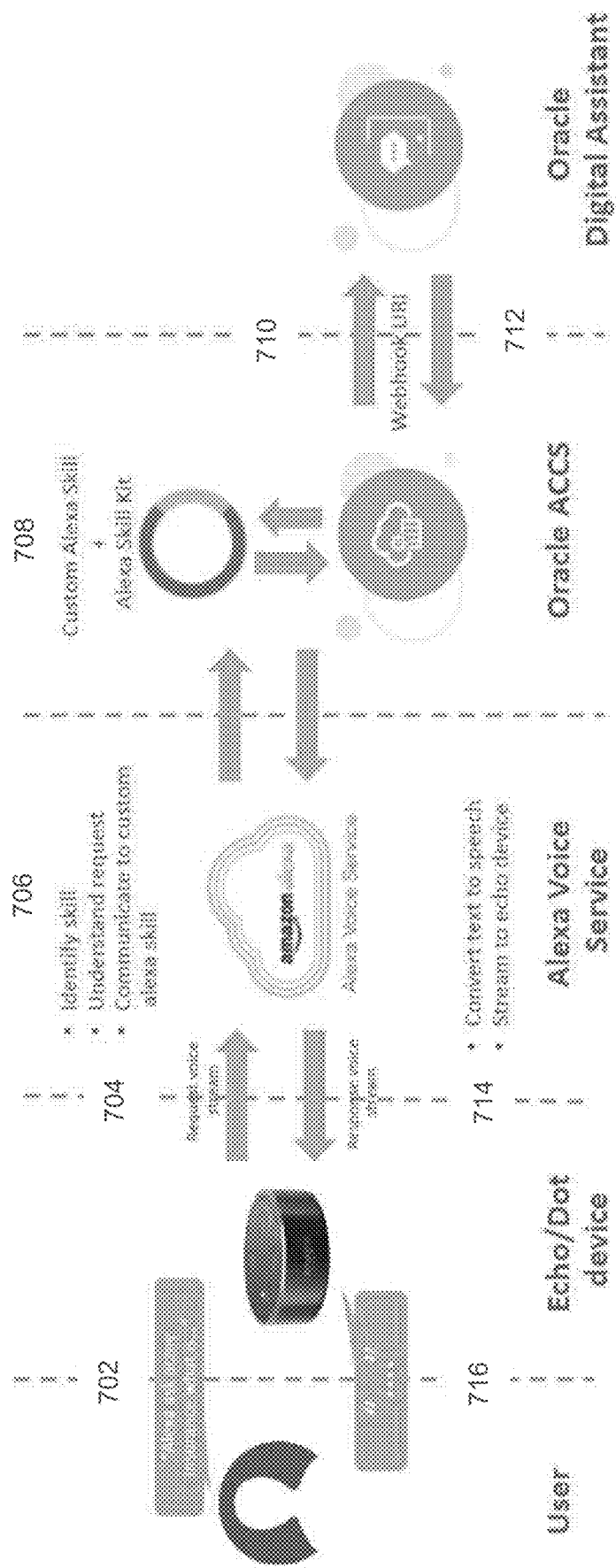
FIG. 7 illustrates user interactions between a client application and a digital assistant according to an example embodiment.

FIG. 7 illustrates user interactions between a client application and a digital assistant according to an example embodiment. Embodiments can implement across a number of technologies, third-party applications, and other heterogeneous environments. For example, in the diagram illustrated in FIG. 7, at 702 a user can communicate with a smart speaker, such as ask a question. The smart speaker can in turn request voice stream service, such as from a voice cloud service, at 706. At 708 the voice cloud service can request service from a digital assistant cloud service. For example, a configured "skill" (or specialized chatbot) can be configured to service the user's utterance (e.g., question from 702). At 710 a webhook (e.g., Webhook uniform resource indicator ("URI")) can be used to communicate with a digital assistant. At 712, the webhook can be used to receive a response from the digital assistant at the digital assistant cloud service. The response can be transmitted from the digital assistant cloud service to the voice cloud service, and ultimately to the smart speaker at 714. The smart speaker can then respond to the user's utterance (e.g., question) at 716. In some embodiments, the flow from FIG. 7 can be used to interact with a user via a smart speaker after receiving consent from the user for interaction on a new client device (e.g., based on a detected signal in a user stream of data and a web push message/notification).

In some embodiments, one or more skills can be configured to implement the communication between a digital assistant (e.g., Oracle® Digital Assistant) and a voice service and/or third-party device (e.g., Alexa voice service/smart speaker, and any other suitable service and device). For example, the one or more skills can process requests from the voice service platform/third-party device (e.g., parse requests, such as HTTP JSON requests from the Alexa voice service platform), communicate with intelligent chatbots via webhook, and build responses to the requests (e.g., build JSON responses that can be consumed by the voice service/third party device, such as the Alexa voice service and smart speaker).

In some embodiments, the digital assistant and voice service/third-party device platform can both use a JSON payload to exchange messages. The format of the messages may be different, and the configured skill can be used to receive and parse a request (e.g., coming from the voice service/third-party device). In some embodiments, the one or more skills can transform the payload from a first format (e.g., format used by the voice service/third-party device) to a second format (e.g., used by the digital assistant). The payload can be sent to an intelligent bot, and it can contain message content and additional information about the user. In some embodiments, the payload can also contain the routing that allows the bot response to be returned (e.g., to the third-party device and the user interacting with the third-party device). The one or more configured skills, which in some embodiments can be a configured application for interacting with the voice service/third-party device platform) can be deployed to a network accessible node (e.g., Oracle® Application Container Cloud Service).

In some embodiments, the voice service/third-party device platform (e.g., Alexa voice service platform) can include APIs for interfacing with the platform. For example, the platform APIs can include speech to text and text to speech transformation functionality. In another example, the APIs can be used to build one or more skills for interacting with the platform. Embodiments utilize the platform APIs to interact with third-party devices (e.g., an Alexa smart-speaker or other client device).

In some embodiments, skills for a third-party device platform can be configured to interact with the digital screen of the third-party device (e.g., smart speaker with a screen, tablet, smart television, smart home device with a screen, and the like). In some embodiments, a software development kit ("SDK") (e.g., Alexa Presentation Language ("APL") SDK) can be utilized to configure skills to control/adjust the visual display of the third-party device. Configuring a visual skill can include one or more of defining/selecting one or more templates, playing a video (e.g., using a built-in video application), and configuring content for display on the third-party device. Third-party device platform APIs can similarly be used to interact with a display of the third-party device.

In some embodiments, displays on multiple devices can be configured simultaneously (e.g., multiple client devices can be configured to display the same or similar content). For example, a skill for a third-party device (e.g., smart speaker with a display screen) can be configured to control the display of the third-party device. In addition, a second client device with a display (e.g., client device displaying a webpage, such as a smartphone, desktop, or tablet) can be configured, for example using an API that controls the content of the display (e.g., the content of a website displayed by the second client device). For example, the display of a website implemented by Oracle® Commerce Service can be adjusted using Oracle® Commerce Cloud REST APIs. For example, Store API endpoints can provide access to a storefront, Admin API endpoints can provide access to administrative functionality on the administration server, Agent API endpoints can provide access to agent functionality on the administration server, and Social Wish Lists API endpoints can be used to configure wish list features. In some embodiments, one or more Oracle® Commerce Cloud REST APIs can be used to control/adjust the display of a webpage, and thus the display of the second client device.

In some embodiments, the skills/APIs for the third-party device platform and the APIs for controlling/adjusting the display of a second client device can be used in combination. For example, the screens for the third-party device (e.g., smart speaker with a display screen) and the second client device (e.g., smartphone, tablet, laptop, or desktop displaying a website) can be controlled simultaneously, and the content displayed on these devices can be coordinated. In some embodiments, the screen for the third-party device and the screen for the second client device can be configured to display the same or similar content. In some embodiments, a third-party device can include a device with a screen (e.g., smart speaker with a screen) or a device configured to control a screen (e.g., Google Chromecast, Amazon Firestick, and the like).

In some embodiments, once a signal is recognized in a data stream generated by a user interacting with a client device (e.g., web enabled device) a user interaction with a second client device can be triggered. For example, the second client device can be proximate to the user. In some embodiments, a user can interact with the first client device (e.g., a smartphone) to access a webpage or interface with a web application (e.g., implemented by (OCCS)). The first client device (and optionally browser/application running) can be assigned a visitor_id1 value (e.g., from the Visitor ID service of OCCS). In some embodiments, a signal can be recognized in the stream of data received from the first client device (e.g., indicative of the user's interactions with the webpage or web application). Based on the recognized signal (e.g., intent) a digital assistant (e.g., Oracle® Digital Assistant) can be invoked, such as after receiving consent (e.g., based on a web message/notification sent to the first client device). In some embodiments, the original visitor_id1 parameter can be passed to the digital assistant.

The digital assistant can then invoke a third-party virtual private assistant ("VPA"), such as for speech recognition and natural language understanding ("NLU") functionality. The third-party virtual private assistants can include Amazon/Alexa Voice Services, Google Assistant, and the like. In some embodiments, the digital assistant may also include speech recognition, NLU, and other voice functionality (e.g., Oracle® Digital Assistant using Speak.ai services). In some embodiments, a profile and/or user information based on the visitor ID (e.g., profile and/or account information such as personal/work email address, corporate email account, hotel room number, mobile phone number, location, and the like) can be passed to the third-party platform.

In some embodiments, the third-party platform can then trigger an interaction with one or more devices on the third-party's platform that are proximate to the user (e.g., a proximate smart speaker/device, such as with or without screen displays) based on the user profile/information. For example, one or more third-party devices may be associated with the profile/user information provided to the third-party. In some embodiments, the digital assistant is in communication with the service that implements the webpage/web application (e.g., displayed on the first client device), and can utilize the common vistor_id1 value to share relevant user data (e.g., shopping cart information, user profile information, other context, and the like). For example, Oracle® Mobile Cloud (which can host the digital assistant in some embodiments) can include location based services, which can provide the ability to deliver contextual information based on the user's location (e.g., using a combination GPS and Beacons). The digital assistant can also be in communication with the third-party platform, and thus can continuously pass the relevant user data to the third-party, which can utilize the information to interact with the user using the proximate third-party device.

In some embodiments, the user interaction with the third-party device can be triggered using the third-party platform, relevant APIs, and relevant authorizations and/or authentications. For example, Alexa Voice Service ("AVS") allows developers to voice-enable connected products with a microphone and speaker. Events are considered messages sent from a device to the cloud notifying the third-party platform that something has occurred. The third-party platform API can use logins with the platform (e.g., Login with Amazon (LWA)) for product authorization and can expose an HTTP/2 endpoint.

Figure 8:
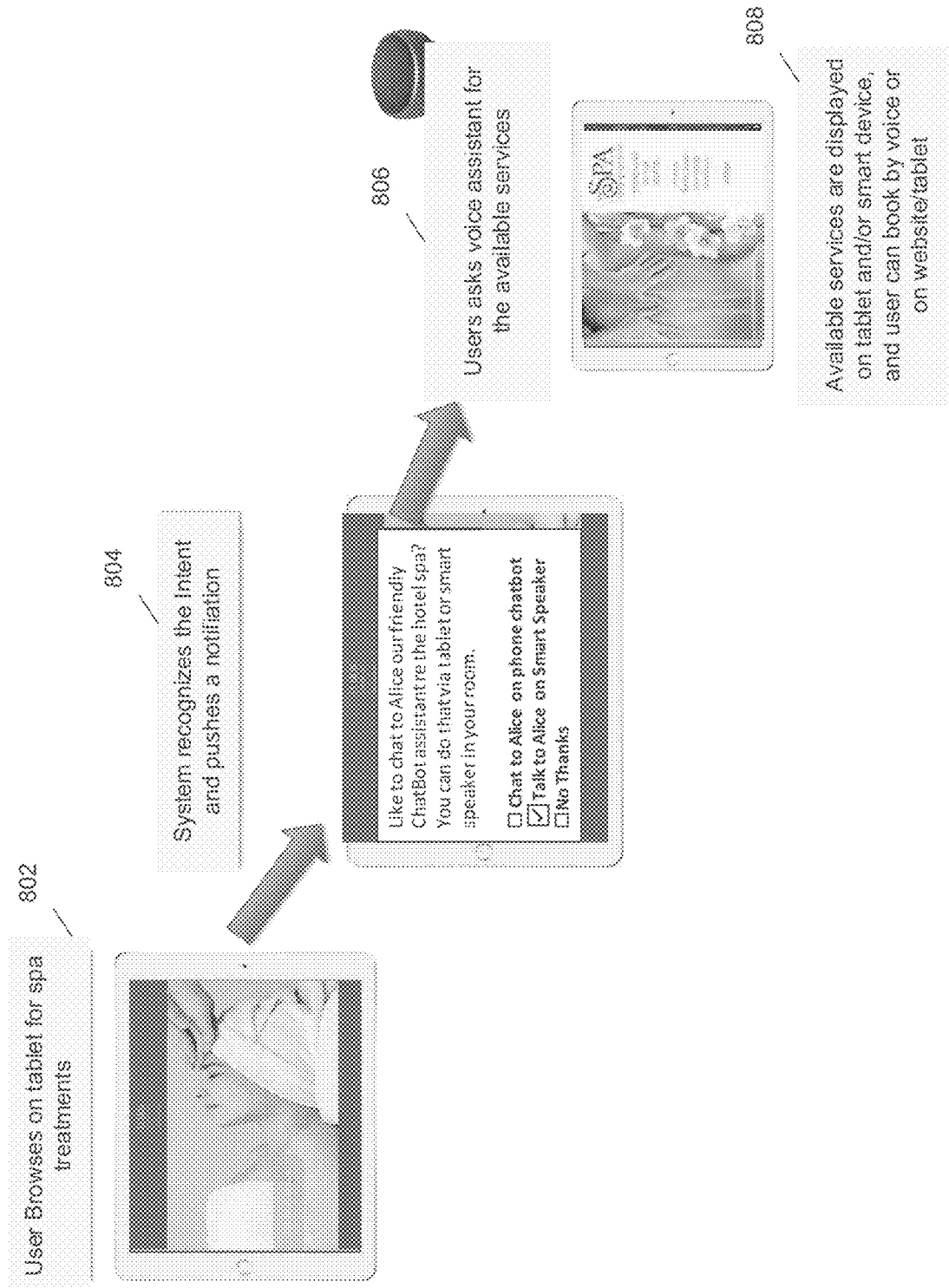
FIGS. 8-11 illustrate example uses cases of interacting with a user across multiple channels based on a detected signal according to an example embodiment.

FIGS. 8-11 illustrate example uses cases of interacting with a user across multiple channels based on a detected signal according to an example embodiment. In FIG. 8 at 802, a user interacts with a browser on a tablet to view options for a spa, such as spa treatments. At 804, a user signal is detected (e.g., intent to purchase a spa treatment) and a push notification is sent to the tablet. At 806, a user interaction with a proximate smart speaker begins based on consent received from the user (e.g., via the push notification), where the user asks for available spa services. At 808 the available services are displayed on the tablet (or smart device), and the user can book a spa treatment either by voice or on the website.

Figure 9:
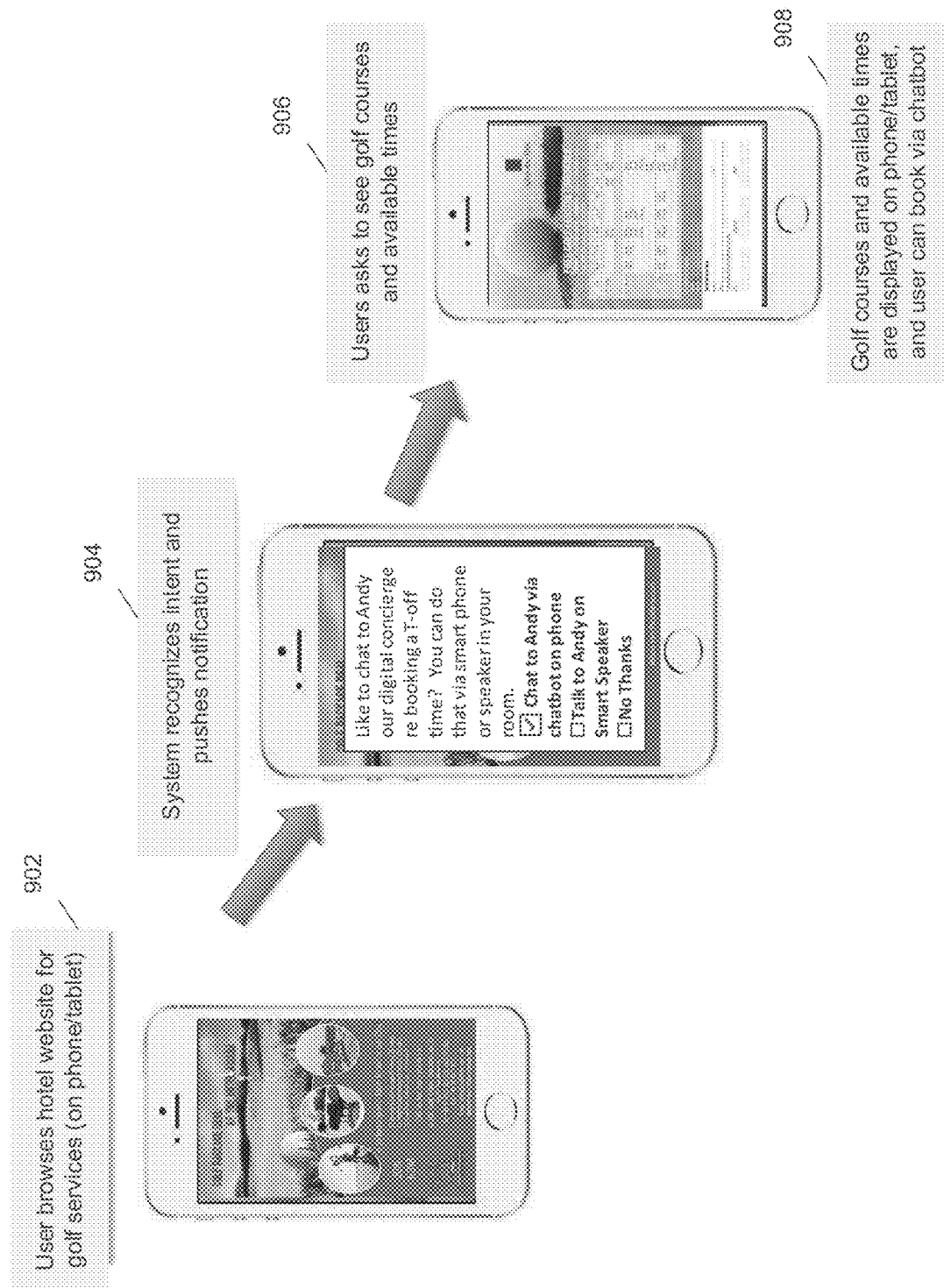

In FIG. 9 at 902, a user interacts with a browser on a smartphone to view options for golfing, such as golf services. At 904, a user signal is detected (e.g., intent to purchase a golf service) and a push notification is sent to the smartphone. At 906, a user interaction with the smartphone or voice begins based on consent received from the user (e.g., via the push notification), where the user asks for available golf service. At 908 the available services are displayed on the smartphone, and the user can book a golf service either by voice or on the website.

Figure 10:
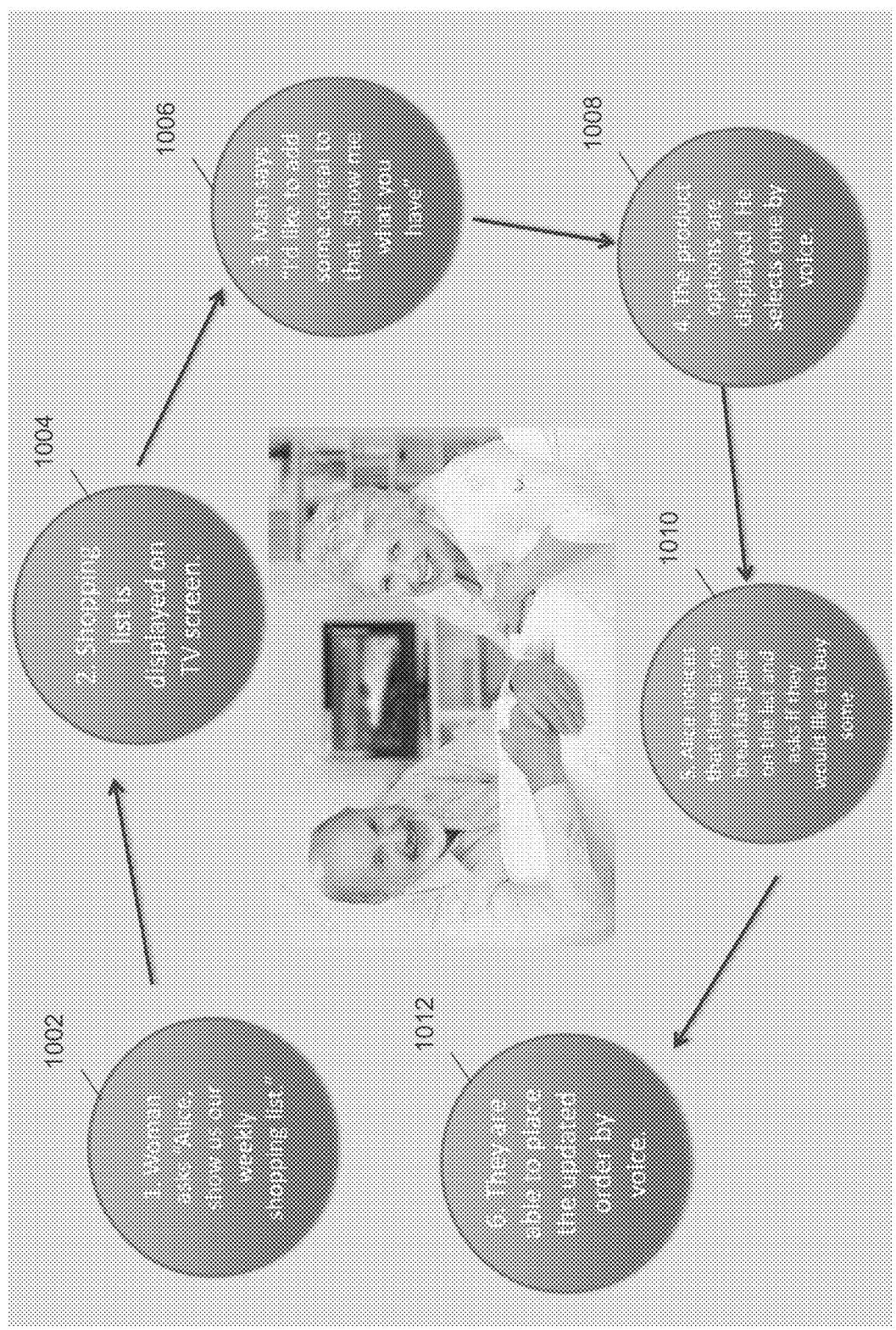

In FIG. 10 at 1002, a user interacts with a smart speaker (e.g., a first client device) and asks about a weekly shopping list. At 1004, the shopping list is displayed on the television screen (e.g., a second client device). At 1006, a user speaks to the smart speaker and asks to add an item, cereal, to the shopping list. At 1008, product options are displayed on the television screen and/or provided by the smart speaker, and the user selects one by voice by interacting with the smart speaker. At 1010, a smart assistant (e.g., smart assistant cloud service) recognizes that an item is missing from the shopping list (e.g., detects a signal in the data stream), such as breakfast juice, and prompts the user to add the item. At 1012, the user updates the shopping list by selecting a breakfast juice by voice. In some embodiments, the user can receive a text response (e.g., displayed on the television screen) to spoken questions (which helps address the challenges of voice assistant interactions in a noisy environment). In some embodiments, the user can interact with a single device, such as a smart television (which can have internet connectivity, voice recognition ("Hi TV"), as well as a built-in/integrated microphone for smart speaker-like voice control/digital assistant functionality). In some embodiments, the user can receive a push/web notification (e.g., on a smartphone) as a reminder to review their weekly shopping list based on a day of the week, or this message can be displayed on the television screen.

Figure 11:
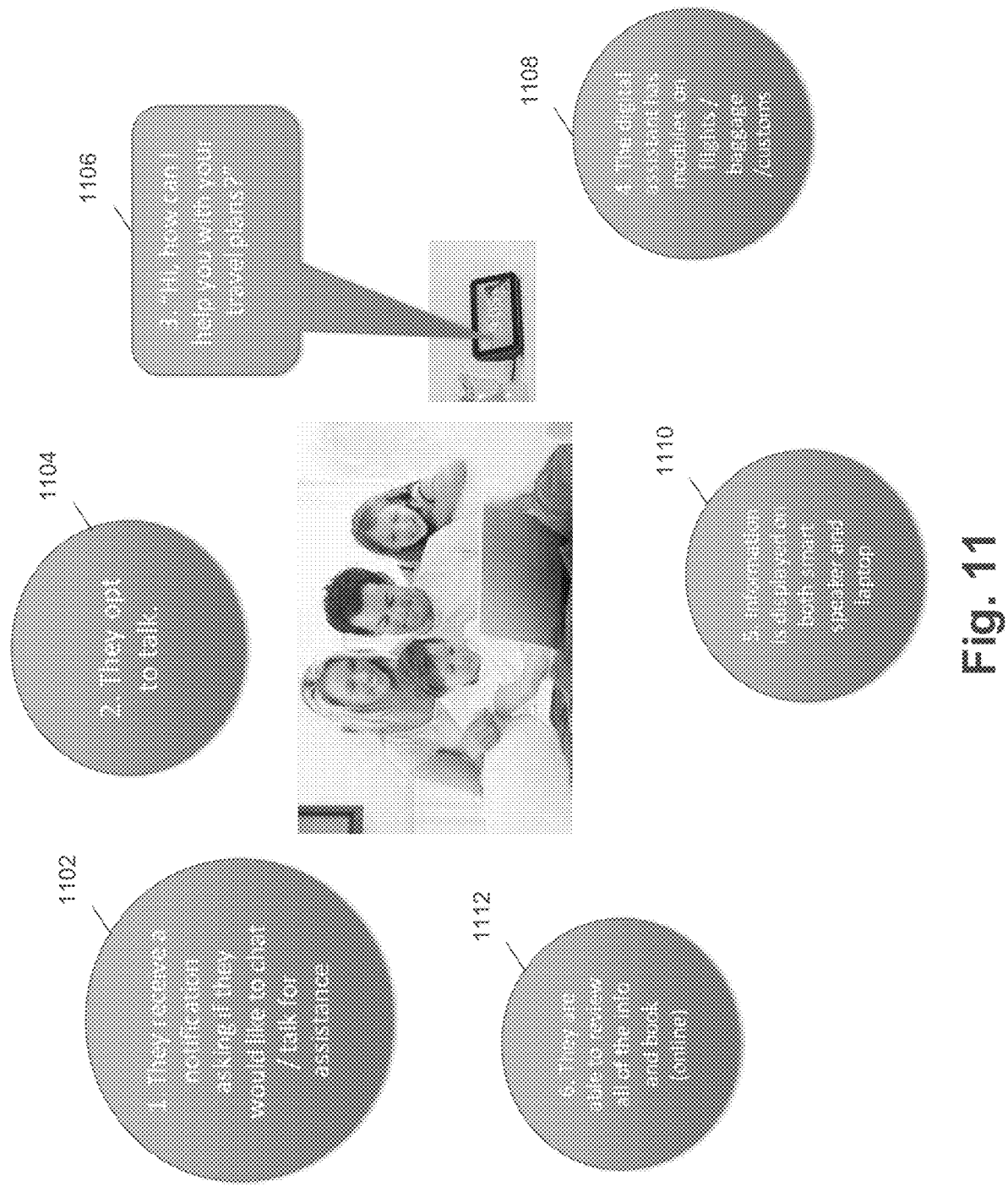

In FIG. 11 a user (or multiple users) is interacting with a travel webpage using a browser on a laptop, tablet, or smartphone. At 1102, the user receives a notification (e.g., based on a recognized signal in the user's web activity) asking if the user would like to chat with a nearby device for assistance. At 1104, the user provides consent to talk. At 1106, a transaction with a smart speaker that includes a display is initiated. At 1108, the smart speaker is in communication with a software digital assistant that includes various modules (or skills) related to travel, such as flights, baggage, customs, and the like, and the user can interact with the smart speaker to get information about these different aspects of travel. At 1110, information is displayed on the display of the smart speaker simultaneously with information displayed on the laptop, tablet, or smartphone. At 1112, the user books travel through an interaction with the smart speaker or an interaction with the laptop, tablet, or smartphone (e.g., based on the information gathered while interacting with both the smart speaker and the laptop, tablet, or smartphone).

In some embodiments, a signal (e.g., trend or intent) can be recognized in a user data stream (e.g., generated while a user interacts with a first client device), and based on the recognized signal an interaction with a second client device can be triggered. In some embodiments, the user may be interacting with the first client device and the second client device when the signal is recognized in the user data stream, and the user's interactions with the first client device and second client device (e.g., display of the devices or audio from the devices) can be configured based on the recognition. The user interactions can include visual interactions (e.g., display of information, text or chat, and the like), audio interactions (e.g., voice interactions, both transmitting and receiving, or other audio signals), a combination of these, and any other suitable interaction.

In some embodiments, based on one or more of the interactions, an action can be performed by execution of a software function. For example, based on a newly triggered interaction with a second client device, or interactions with both the first client device and the second client device, an action can be performed by execution of a software function. The software functions/actions can include adding one or more items to a shopping cart, placing an order/purchasing one or more items, tracking the status of a shipment or order (and displaying the results), initiating the return of a purchased item, initiating the exchange of a purchased item, booking an appointment (e.g., with a service professional to repair or troubleshoot an item), executing a database batch process configured based on the user interaction(s), and the like.

In some embodiments, OCCS REST APIs can provide a set of endpoints for implementing one or more of the actions and/or execution of the software function. For example, these APIs can be used extend the capabilities of a digital assistant, website, native application, or any other suitable software interface for interacting with a user over a given channel. In some embodiments, third-party services, such as payment gateways, tax services, inventory management, and/or order management systems ("OMS"), can be accessed via secure webhooks.

In some embodiments, a digital assistant (e.g., Oracle Digital Assistant), such as a digital assistant interacting with a client in a dialogue or verbal mode, can request OCCS (e.g., via REST API interface) to add/remove items to/from a cart (or wish-list), submit/cancel/update an order, return or exchange an order, track the status of an order, request order history, request current orders, update a shopper profile, and any other suitable function/action. In some embodiment, an executed database process can include a request for an order history report, a request for a list/report of unfulfilled orders (or different order processing state—'saved', 'fulfilled', 'cancelled', 'approved', and the like), a request for a list/report of unpaid orders (or different payment status—'pending', 'settled', 'invoiced', and the like), a request for any of the above list/reports to be emailed out or displayed on a client device, a request to expedite/update the shipping method of open orders (e.g., from 3-day to overnight), a request to publish content (e.g., catalog updates) from staging/preview systems to the production storefront (which can be database intensive), where the request could be triggered/based on increasing/decreased sales of relevant products/brands/categories, and/or a request for OMS to update order/inventory status.

In some embodiments, Oracle® Integration Cloud ("OIC") can be used for implementing one or more of the actions and/or execution of the software function. For example, OIC can integrate applications and data by leveraging a library of pre-built adapters to connect with a variety of applications, services, and/or databases, such as OCCS to an ERP (e.g., Oracle® e-Business Suite ("EBS")) system integration for order/shopper/catalog/inventory/promotion processing.

Figure 12:
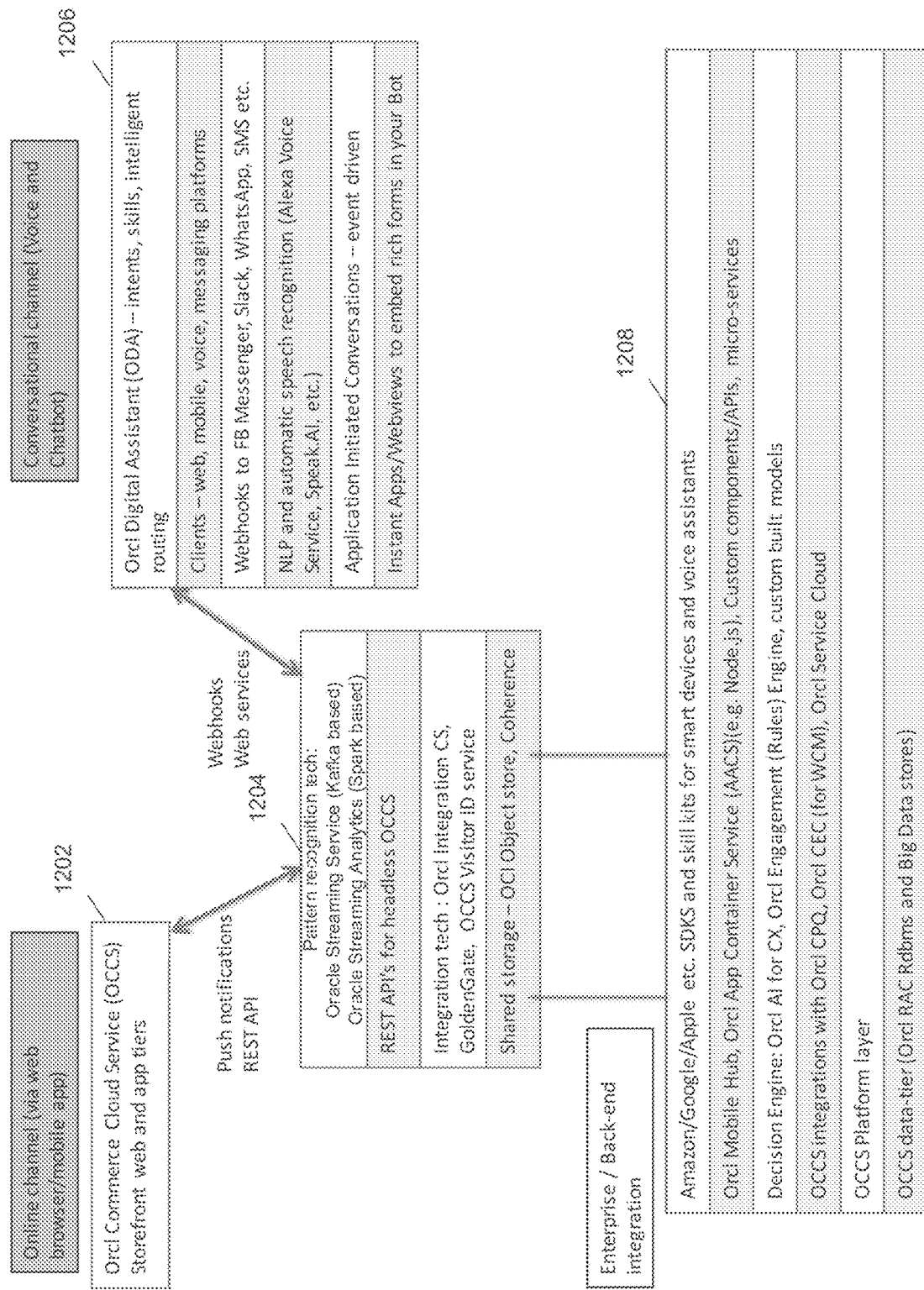
FIG. 12 illustrates a sample architecture according to an example embodiment.

FIG. 12 illustrates a sample architecture according to an example embodiment. The illustrated architecture includes cloud service 1202, which can include Oracle® Commerce Cloud Service storefront web and application tiers. For example, cloud service 1202 can represent an online or web channel. Processors 1206 can communicate with cloud service 1202 (e.g., using push notification APIs) and can communicate with digital assistant and messenger 1206 (e.g., using a webhook and/or web services). In some embodiments, digital assistant and messenger 1206 can include Oracle® Digital Assistant, clients (e.g., web, mobile, voice, messaging platforms), webhooks to FB Messenger, Slack, WhatsApp, SMS, and the like, NLP and speech recognition services (e.g., Alexa Voice Service, Speak.ai, and the like), Application initiated conversations (e.g., event driven), and/or Instant Apps/Webviews that can be used to embed rich formats, such as in chat windows. For example, digital assistant and messenger 1206 can represent a conversational channel (e.g., voice and/or chat).

In some embodiments, processors 1204 can include pattern recognition software such as Apache Kafka, Oracle® Cloud Infrastructure ("OCI") Streaming Service, Oracle® Streaming Analytics, and the like, REST APIs for headless OCCS, Integration technologies (e.g., Oracle® Integration CS, GoldenGate, OCCS Visitor ID service, and the like), and/or shared storage (e.g., OCI object store, Coherence cache, and the like). Processors 1204 can communicate with back-end 1208. In some embodiments, back-end 1208 can include skill sets for smart devices and/or voice assistants (e.g., Software Development Kits (SDKs) and/or libraries for Amazon, Google, Apple, and any other SDKs for smart devices and/or voice assistants), Oracle Mobile Hub, Oracle Application Container Service (e.g., Node.js), custom components/apps, and/or microservices, a decision engine (e.g., Oracle AI for CX, Oracle Engagement Engine, and/or custom built models), OCCS integration, OCCS Platform layer, and/or OCCS data-tier (e.g., Oracle RAC RDBMS, and big data stores).

Figure 13:
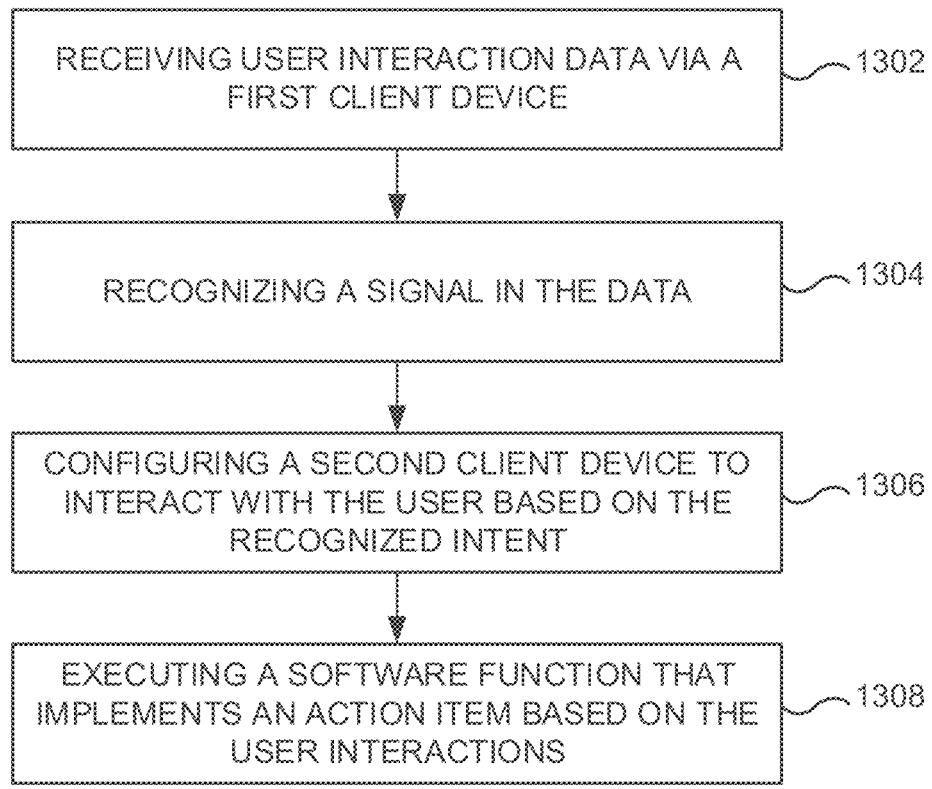
FIG. 13 illustrates a flow diagram for triggering a user interaction with a device based on a detected signal according to an example embodiment.

FIG. 13 illustrates a flow diagram for triggering a user interaction with a device based on a detected signal according to an example embodiment. In some embodiments, the functionality of FIG. 12 can be implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In embodiments, the functionality of FIG. 12 can be performed by one or more elements of system 200 of FIG. 2.

At 1302, data associated with a user interaction can be received, where the data can include input that was received from the user at a first device. For example, the first user device can be a smartphone, tablet, or laptop, and the interaction can be a user interacting with a native application or a web browser. In some embodiments, the received data is a stream of user data that indicates a user's web activity.

At 1304, a signal is recognized based on the received data about the user. For example, the signal can indicate an intent, such as an intent to buy a product or service, or any other suitable intent. In some embodiments, the signal can also indicate value in a secondary interaction with the user, such as a problem that can be navigated with the user over another means of interaction. For example, the recognized signal can be a dwell time on a webpage that meets a criteria. In some embodiments, the stream of user data can be a real-time stream of web data based on the user's interactions with a web browser, and the recognized signal can be recognized within the real-time stream of user data.

At 1306, a second device is configured to interact with the user based on the recognized signal, the interacting including an audio interaction or a visual interaction. For example, a second device such as a smart speaker can be configured to interact with the user. The smart speaker can be configured to interact with the user over voice, using a visual display, and/or a combination of these.

In some embodiments, the first device and second device are communicatively coupled with a server that configures the second device to interact with the user based on the recognized signal. For example, the first device can be a smart phone or tablet and the second device can be a smart speaker. In some embodiments, the configuring of the second device to interact with the user based on the recognized signal occurs in real-time while the user is interacting with the first device (e.g., a web browser on the first device).

In some embodiments, an audio interaction with the second device can include an audio output from a speaker and audio input from a microphone. In some embodiments, a visual interaction with the second device can include display of a user interface configured based on the recognized signal and user input received on the user interface or audio input received at a microphone.

At 1308, a software function that implements an action item can be executed, where the execution of the software function is based on second input from the user received at the second device and the second input triggers the software function. For example, where the recognized signal indicates a purchasing intent, the software function can be completing the purchase of a good or service. In some embodiments, the completion of the purchase of the good or service can be based on receiving input at the second device (e.g., the smart speaker) after interacting with the user about the good or service. In some embodiments, the executed software function that implements the action item achieves one or more of adding an item to a shopping cart, executing a database batch process, initiating a return or exchange of an item, and tracking the status of a shipment or order.

Embodiments trigger a user interaction with a device based on a detected signal. For example, a user can initiate an interaction with a digital assistant, for example through a text based chat channel or a conversational channel, or a user can interact with a webpage, web application, or any other suitable web presence (e.g., a web channel interaction). Based on this interaction, a signal can be detected by embodiments, such as through the use of machine learning, rules, or other techniques. For example, through a chat or conversation with the user, a chatbot can identify a signal in the user interaction, or a configured server can identify a signal in a user's web actions. In some embodiments, the signal can indicate a user's interest in purchasing a product or service.

In some embodiments, based on the user's interactions on a first client device and one or more detected signals, a second user device can be configured to interact with the user in a different channel. For example, a signal identified for a text based chat interaction on first user device (e.g., smartphone) can be used to trigger interaction with the user on a tablet (e.g., a display based interaction) or using a smart speaker (e.g., conversational interaction). In another example, a signal identified in a user's web actions using a first user device (e.g., tablet) can be used to trigger a text or dialogue based interaction (e.g., on a separate client device, such as a smartphone) or an interaction using a smart speaker (e.g., conversational voice interaction).

Embodiments can trigger user interaction on a separate client device in a different channel to improve user experience. For example, some users may prefer having certain interactions on certain devices (e.g., selecting from a list of service options on a tablet rather than a smartphone, navigating a menu based on a conversation with a smart speaker rather than a text based chat on a smartphone or tablet, and the like). Embodiments leverage the proliferation of client devices to interact with users in a preferred manner, and thus improve user experience.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

I claim:

1. A method for detecting a signal to configure a user device, wherein the method comprises:
    receiving, at one or more servers, a real-time stream of user data that represents a users real-time interactions with a web browser, wherein the user data comprises input that was received from the user at a first device;
    recognizing, by the one or more servers, a pattern within the real-time stream of user data, wherein the recognized pattern comprises a pattern of user web activity at a website displayed at the first device that is indicative of the users intent;
    triggering, by the one or more servers, a second device to interact with the user based on the recognized pattern, the second device interaction comprising an audio interaction or a visual interaction, wherein, after the second device is triggered to interact with the user, the first device and second device are configured to simultaneously interact with the user; and
    executing a software function that implements an action item, wherein the execution of the software function is based on second input from the user received at the second device.

2. The method of claim 1, wherein the first device comprises a smart phone or tablet and the second device comprises a smart speaker.

3. The method of claim 2, wherein the audio interaction comprises audio output from a speaker and audio input from a microphone, or the visual interaction comprises display of a user interface configured based on the recognized pattern and user input received on the user interface or audio input received at a microphone.

4. The method of claim 1, wherein the recognized pattern comprises a dwell time on a webpage of the website that meets a criteria.

5. The method of claim 1, wherein the triggering of the second device to interact with the user based on the recognized pattern occurs in real-time while the user is interacting with the web browser.

6. The method of claim 1, wherein the executed software function that implements the action item performs one or more of executing a database batch process, initiating a return or exchange of an item, and tracking a status of a shipment or order.

7. The method of claim 1, wherein the second device is triggered to interact with the user based on a push message transmitted to the first device and the user's selection of the push message.

8. The method of claim 1, wherein the simultaneous interaction comprises configuring a display of a webpage at the web browser of the first device in combination with configuring the audio interaction or visual interaction at the second device.

9. The method of claim 1, wherein the simultaneous interaction comprises mirroring content displayed at the first device and the second device.

10. The method of claim 1, wherein the simultaneous interaction comprises configuring a display of a webpage at the web browser of the first device in combination with configuring an audio chat interaction with a digital assistant at the second device.

11. The method of claim 1, wherein the recognized pattern corresponds to user interactions with the web browser that repeatedly view a given product webpage and the users intent comprises purchase interest in the given product.

12. The method of claim 1, further comprising:
comparing, by the one or more servers, contextual information for the user to one or more criteria, wherein the second device is triggered to interact with the user based on the recognized pattern and the contextual information for the user meeting the one or more criteria.

13. The method of claim 12, where the contextual information for the user comprises at least a transaction history, and the criteria comprises a purchase frequency for one or more products.

14. A system for detecting a signal to configure a user device, the system comprising:
a processor; and
a memory storing instructions for execution by the processor, the instructions configuring the processor to:
receive, at one or more servers, a real-time stream of user data that represents a users real-time interactions with a web browser, wherein the user data comprises input that was received from the user at a first device;
recognize, at the one or more servers, a pattern within the real-time stream of user data, wherein the recognized pattern comprises a pattern of user web activity at a website displayed at the first device that is indicative of the user's intent;
triggering, at the one or more servers, a second device to interact with the user based on the recognized pattern, the second device interaction comprising an audio interaction or a visual interaction, wherein, after the second device is triggered to interact with the user, the first device and second device are configured to simultaneously interact with the user; and
execute a software function that implements an action item, wherein the execution of the software function is based on second input from the user received at the second device.

15. The system of claim 14, wherein the first device comprises a smart phone or tablet and the second device comprises a smart speaker.

16. The system of claim 15, wherein the audio interaction comprises audio output from a speaker and audio input from a microphone, or the visual interaction comprises display of a user interface configured based on the recognized pattern and user input received on the user interface or audio input received at a microphone.

17. The system of claim 14, wherein the recognized pattern comprises a dwell time on a webpage of the website that meets a criteria.

18. The system of claim 14, wherein the triggering of the second device to interact with the user based on the recognized signal occurs in real-time while the user is interacting with the web browser.

19. The system of claim 14, wherein the executed software function that implements the action item performs one or more of executing a database batch process, initiating a return or exchange of an item, and tracking a status of a shipment or order.

20. A non-transitory computer readable medium having instructions stored thereon that, when executed by a processor, cause the processor to detect a signal to configure a user device, wherein, when executed, the instructions cause the processor to:
receive, at one or more servers, a real-time stream of user data that represents a users real-time interactions with a web browser, wherein the user data comprises input that was received from the user at a first device;
recognize, at the one or more servers, a pattern within the real-time stream of user data, wherein the recognized pattern comprise a pattern of user web activity at a website displayed at the first device that is indicative of the user's intent;
triggering, at the one or more servers, a second device to interact with the user based on the recognized pattern, the second device interaction comprising an audio interaction or a visual interaction, wherein, after the second device is triggered to interact with the user, the first device and second device are configured to simultaneously interact with the user; and
execute a software function that implements an action item, wherein the execution of the software function is based on second input from the user received at the second device.

* * * * *

UNITED STATES PATENT AND TRADEMARK OFFICE
CERTIFICATE OF CORRECTION

PATENT NO. : 11,615,097 B2
APPLICATION NO. : 16/806531
DATED : March 28, 2023
INVENTOR(S) : Jarlath Trainor It is certified that error appears in the above-identified patent and that said Letters Patent is hereby corrected as shown below:

In the Specification

In Column 7, Line 59, delete "("GUis")" and insert -- ("GUis")) --, therefor.

In Column 15, Line 40, delete "platform)" and insert -- platform, --, therefor.

In the Claims

In Column 22, Line 19, in Claim 1, delete "users" and insert -- user's --, therefor.

In Column 22, Line 26, in Claim 1, delete "users" and insert -- user's --, therefor.

In Column 23, Line 11, in Claim 11, delete "users" and insert -- user's --, therefor.

In Column 23, Line 28, in Claim 14, delete "users" and insert -- user's --, therefor.

In Column 24, Line 29, in Claim 20, delete "users" and insert -- user's --, therefor.

In Column 24, Line 34, in Claim 20, delete "comprise" and insert -- comprises --, therefor.

Signed and Sealed this
Thirteenth Day of February, 2024

*Katherine Kelly Vidal*
Katherine Kelly Vidal
*Director of the United States Patent and Trademark Office*